United States Patent
Adachi et al.

(10) Patent No.: US 10,477,479 B2
(45) Date of Patent: Nov. 12, 2019

(54) WIRELESS COMMUNICATION DEVICE DETECTION

(71) Applicant: KABUSHIKI KAISHA TOSHIBA, Minato-ku, Tokyo (JP)

(72) Inventors: Tomoko Adachi, Kanagawa (JP); Takafumi Sakamoto, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 63 days.

(21) Appl. No.: 15/705,090

(22) Filed: Sep. 14, 2017

(65) Prior Publication Data

US 2018/0206193 A1    Jul. 19, 2018

(30) Foreign Application Priority Data

Jan. 13, 2017   (JP) ................................ 2017-004409

(51) Int. Cl.
*H04W 52/02* (2009.01)
*H04W 72/04* (2009.01)

(52) U.S. Cl.
CPC ... *H04W 52/0251* (2013.01); *H04W 72/0406* (2013.01)

(58) Field of Classification Search
CPC ......... H04W 52/0251; H04W 52/0216; H04W 52/0235; H04W 72/0406; Y02D 70/00; Y02D 70/26; Y02D 70/1264; Y02D 70/144; Y02D 70/142; Y02D 70/164; Y02D 70/1262; Y02D 70/168
See application file for complete search history.

(56) References Cited

U.S. PATENT DOCUMENTS

| | | |
|---|---|---|
| 7,257,182 B1 | 8/2007 | Elliott et al. |
| 8,588,118 B2 | 11/2013 | Sakamoto et al. |
| 2008/0139156 A1* | 6/2008 | Behzad ................ H04B 1/0067 455/296 |

(Continued)

FOREIGN PATENT DOCUMENTS

| | | | |
|---|---|---|---|
| EP | 2 416 608 A1 | 2/2012 | |
| EP | 2 958 378 A1 | 12/2015 | |

(Continued)

OTHER PUBLICATIONS

Aboul-Magd, O. et al., "IEEE P802.11, Wireless LANs: A CSD Proposal for Wake-up Radio (WUR)," IEEE 802.11-16/936r4, The Institute of Electrical and Electronics Engineers, Inc., Jul. 2016, pp. 1-6.

(Continued)

*Primary Examiner* — Omar J Ghowrwal
(74) *Attorney, Agent, or Firm* — Foley & Lardner LLP

(57) ABSTRACT

According to one embodiment, a wireless communication device includes: a wireless communicator configured to transmit and receive a signal; and controlling circuitry configured to detect a first wireless communication device through the wireless communicator. The wireless communicator is configured to transmit a control signal preset between the wireless communication device and the first wireless communication device to activate the first wireless communication device when the controlling circuitry has not detected the first wireless communication device.

17 Claims, 19 Drawing Sheets

(56) References Cited

U.S. PATENT DOCUMENTS

2016/0374022 A1    12/2016   Ang et al.

FOREIGN PATENT DOCUMENTS

| JP | 2009-077375 A | 4/2009 |
|---|---|---|
| JP | 2015-136166 A | 7/2015 |

OTHER PUBLICATIONS

Adachi, T. et al., "Usage Model for Power Saving AP," IEEE 802.11-17/65r0, The Institute of Electrical and Electronics Engineers, Inc., Jan. 2017, pp. 1-8.

Azizi, S. et al., "IEEE P802.11, Wireless LANs: A PAR Proposal for Wake-up Radio," IEEE 802.11-16/1045r9, The Institute of Electrical and Electronics Engineers, Inc., Jul. 2016, pp. 1-5.

Eastlake, D. et al., "IEEE P802.11, Wireless LANs: A CSD Proposal for Wake-up Radio (WUR)," IEEE 802.11-12-1077r04, The Institute of Electrical and Electronics Engineers, Inc., Sep. 2016, pp. 1-6.

IEEE Standards Association/Computer Society, "Part 11: Wireless LAN Medium Access Control (MAC) and Physical Layer (PHY) Specifications," IEEE Std 802.11™-2012, The Institute of Electrical and Electronics Engineers, Inc., Mar. 2012, pp. 1-2793.

IEEE Standards Association/Computer Society, "Part 11: Wireless LAN Medium Access Control (MAC) and Physical Layer (PHY) Specifications, Amendment 4: Enhancements for Very High Throughput for Operation in Bands below 6 GHz," IEEE Std 802.11ac™-2013, The Institute of Electrical and Electronics Engineers, Inc., Dec. 2013, pp. 1-425.

IEEE Standards Association/Computer Society, "Part 11: Wireless LAN Medium Access Control (MAC) and Physical Layer (PHY) Specifications," IEEE Std 802.11™-2016, The Institute of Electrical and Electronics Engineers, Inc., Dec. 2016, pp. 1-3534.

Li, N. et al., "AP Discovery Discussion," IEEE 802.11-17/68r0, The Institute of Electrical and Electronics Engineers, Inc., Jan. 2017, pp. 1-9.

Park, M. et al., "Low-Power Wake-Up Receiver (LP-WUR) for 802.11," IEEE 802.11-15/1307r1, The Institute of Electrical and Electronics Engineers, Inc., Nov. 2015, pp. 1-18.

Park, M. et al., "IEEE P802.11, Wireless LANs: A PAR Proposal for Wake-up Radio," IEEE 802.11-16-859r0, The Institute of Electrical and Electronics Engineers, Inc., Jul. 2016, pp. 1-5.

Park, M. et al., "Proposal for Wake-Up Receiver (WUR) Study Group," IEEE 802.11-16-0722r1, The Institute of Electrical and Electronics Engineers, Inc., May 2016, pp. 1-14.

Son, J. et al., "WUR-based Power Save Operations of AP," IEEE 802.11-16/939r1, The Institute of Electrical and Electronics Engineers, Inc., Jul. 2016, pp. 1-10.

Wang, X. et al., "Power Efficient WUR AP Discovery," IEEE 802.11-16-1400r0, The Institute of Electrical and Electronics Engineers, Inc., Nov. 2016, pp. 1-9.

Wang, X. et al., "Power Efficient WUR AP Discovery—A Follow Up," IEEE 802.11-17/42r0, The Institute of Electrical and Electronics Engineers, Inc., Jan. 2017, pp. 1-10.

\* cited by examiner

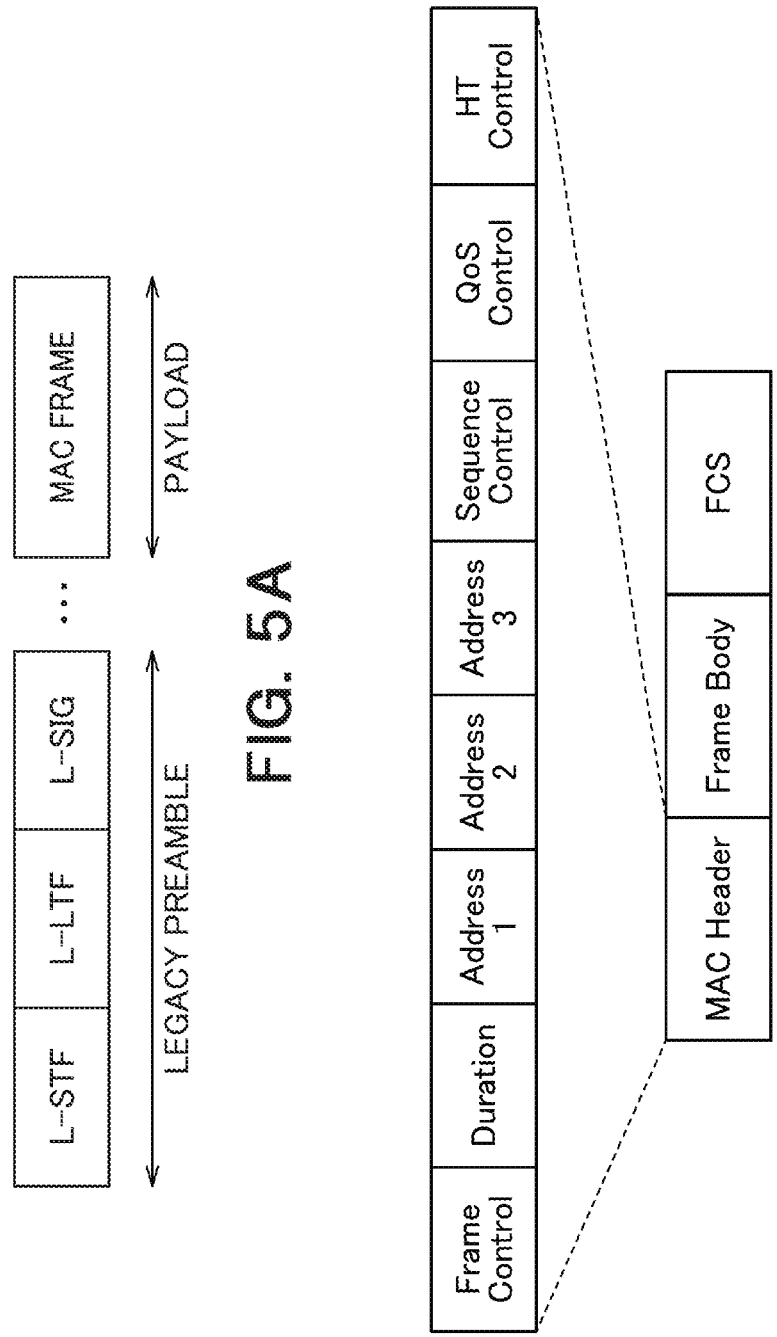

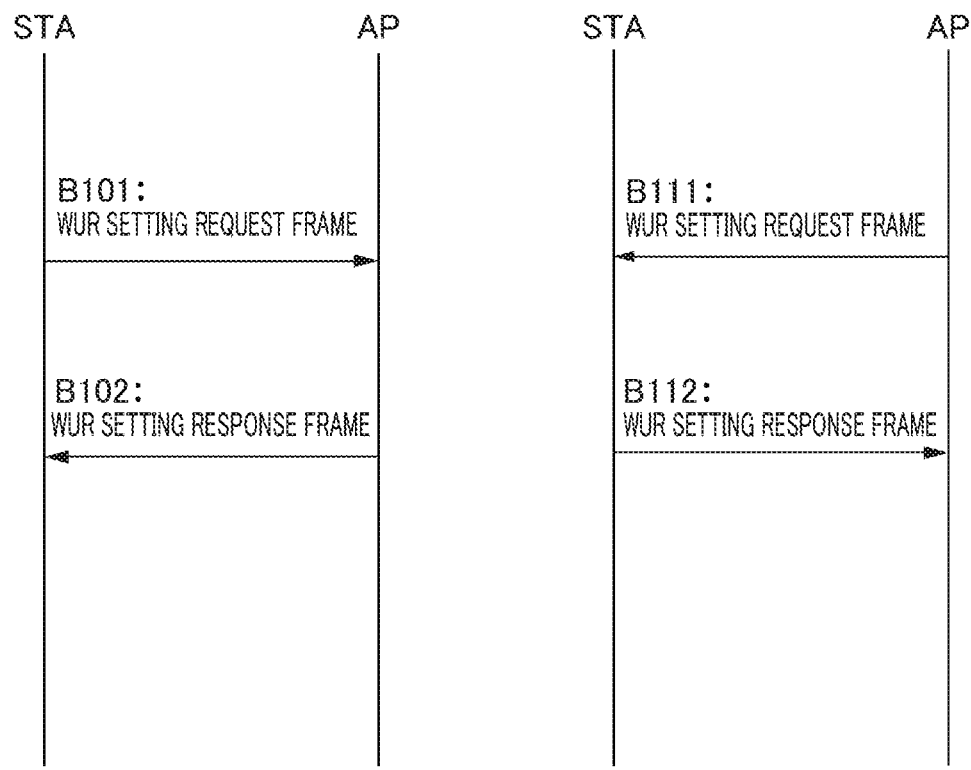

WIRELESS COMMUNICATION DEVICE DETECTION

CROSS REFERENCE TO RELATED APPLICATIONS

This application is based upon and claims the benefit of priority from the prior Japanese Patent Application No. 2017-004409, filed on Jan. 13, 2017, the entire contents of which are incorporated herein by reference.

FIELD

Embodiments described herein relate to a wireless communication device and a wireless communication method.

BACKGROUND

There is a proposal that upon receipt of a predetermined signal, the power source is controlled to thereby sleep a base station of a wireless LAN (Local Area Network). For the sake of sleeping the base station, a terminal of the wireless LAN is required to transmit, to the base station, a predetermined signal for causing the base station to perform power source control. In a case of home use or the like, it is desired that transmission of the signal be started without requiring a user's specific action. However, the proposal described above does not disclose any method of achieving such start of transmission. Thus, the power source of the base station is required to be operated by an operation by the user, which is troublesome for the user.

BRIEF DESCRIPTION OF THE DRAWINGS

FIG. 5A is a diagram showing examples of a physical packet and a MAC frame;

FIG. 5B is a diagram showing examples of a physical packet and a MAC frame;

FIG. 8A is a diagram showing a format example of information elements;

FIG. 8B is a diagram showing a format example of information elements;

FIG. 9A is a diagram showing a sequence of negotiation of WUR setting performed between the terminal and the access point;

FIG. 9B is a diagram showing a sequence of negotiations of WUR setting performed between the terminal and the access point;

DETAILED DESCRIPTION

According to one embodiment, a wireless communication device includes: a wireless communicator configured to transmit and receive a signal; and controlling circuitry configured to detect a first wireless communication device through the wireless communicator. The wireless communicator is configured to transmit a control signal preset between the wireless communication device and the first wireless communication device to activate the first wireless communication device when the controlling circuitry has not detected the first wireless communication device.

Hereinafter, embodiments of the present invention will be described with reference to the drawings. The entire contents of IEEE Std 802.11™-2012 and IEEE Std 802.11ac™-2013, known as the wireless LAN specification are herein incorporated by reference in the present specification.

Figure 1:
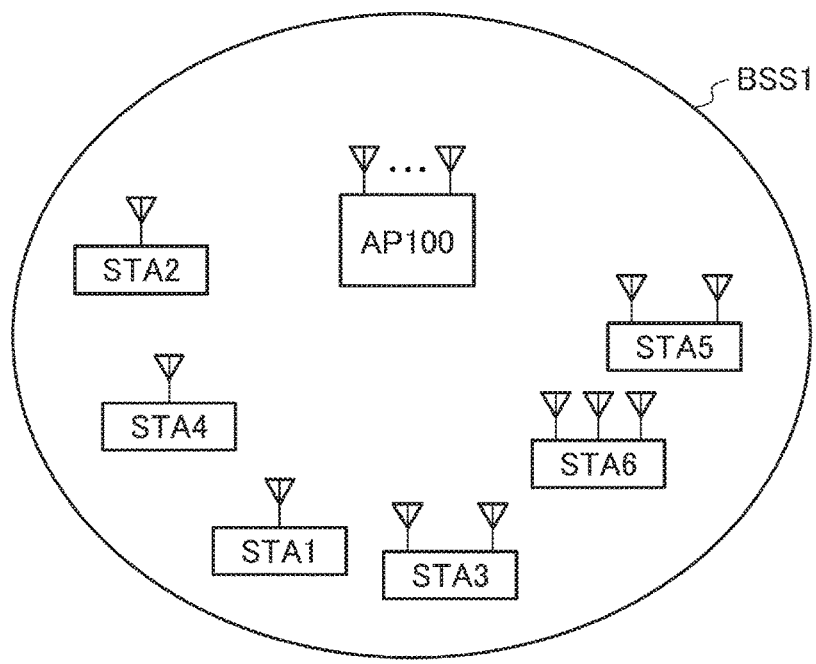
FIG. 1 is a diagram showing a wireless communication system according to an embodiment.
Figure 2:
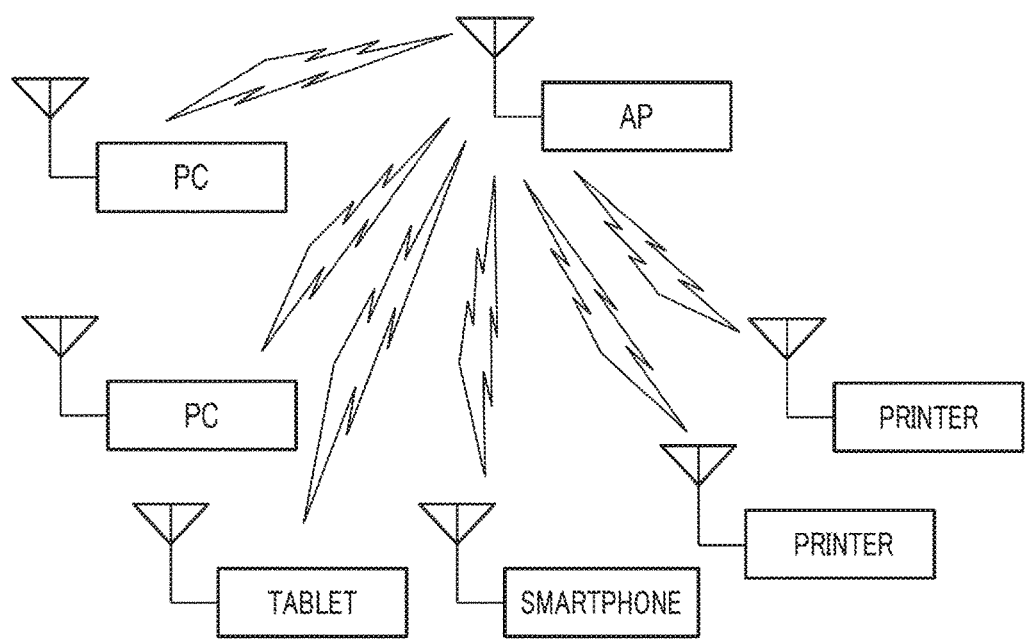
FIG. 2 is a diagram showing an example in which terminals (STAs) are specifically implemented in the wireless communication system in FIG. 1.

FIG. 1 shows a wireless communication system according to an embodiment. This system includes wireless communication base station 100, and multiple wireless communication terminals 1 to 6. The wireless communication base station is called a base station or an access point (AP: Access Point). The wireless communication terminal is called a terminal, wireless communication terminal, or a STA (STA: STAtion). BSS (Basic Service Set) 1 in which AP 100 plays the central role is formed. STAs 1 to 6 join BSS formed by AP 100. This system is a wireless LAN system in conformity with IEEE 802.11 standard that uses CSMA/CA (Carrier Sense Multiple Access with Carrier Avoidance). STAs 1 to 6 may be each any device that includes a function as that of STA. For example, STAs may be mobile apparatuses (smartphones, tablets, etc.) that users carry, printers, or stationary or note PCs (Personal Computers). FIG. 2 shows an example of a network in which STAs 1 to 6 are specifically implemented. In this example, PCs, a tablet, a smartphone, and printers are shown as the types of STAs.

The wireless communication device mounted on an AP communicates with the wireless communication devices mounted on STAs 1 to 6 in conformity with IEEE 802.11 standard. In a wireless LAN conforming to IEEE 802.11 standard, an AP is a type of a STA. A STA having a function of transfer to DS (Distribution System) can be regarded as an AP. In this embodiment, a STA (non-AP STA) that is basically not an AP is represented as a STA. In a case where a STA includes both meanings of a non-AP STA and an AP, representation by AP/STA is sometimes adopted. IEEE 802.11 wireless LAN standard includes not only existing baseline standards and extended standards but also future extended standards, for example, IEEE 802.11ba, which activates the wireless LAN main part of a wireless communication device using a control signal.

Overview of the operation of the wireless LAN in FIG. 1 is described. When AP 100 determines that AP 100 communicates with none of preregistered STAs among STAs 1 to 6, AP 100 transitions to a sleep state. Preregistered STAs may be all STAs 1 to 6, or one or some (e.g., one) of STAs 1 to 6. It is assumed that STAs to be registered are apparatuses that users carry, for example, smartphones. The sleep state is a low power consumption state, and is a state incapable of transmitting and/or receiving a packet for communication. More specifically, this state is achieved by stopping or suppressing power supply to a part (main part) for performing a process pertaining to the wireless LAN. The stop of the power supply to the main part may be to the entire or a part of a main radio unit.

When a STA tries to restart communication with AP 100 (for example, when a user carrying a STA comes home, for example, it can be determined that the STA came home by grasping position information using GPS (Global Positioning System) or a wireless LAN) and searches for AP 100 but cannot find AP 100, the STA determines that there is a possibility that AP 100 is in the sleep state, the STA transmits a control signal for activating AP 100, more specifically, a packet containing a control signal. For example, the STA repetitively transmits the packet containing the control signal during a predetermined period.

Here, the control signal for activation is sometimes called a WUR (Wakeup Radio) signal, or an LP (Low-Power)-WUR signal. Hereinafter, the signal is mainly called a WUR signal. The packet containing the WUR signal is sometimes called a WUR packet.

AP 100 includes, besides the main radio unit of the wireless LAN, an activator (a second PHY processor described later) for receiving the WUR packet according to this embodiment, and a power source controller that controls power supply to the main radio unit. Even during the main radio unit being in the sleep state, the activator can receive the WUR packet. When the activator detects that the WUR signal contained in the WUR packet is the signal that has been preregistered and set between the AP and the STA, the activator operates so as to activate the main radio unit of the wireless LAN through the power source controller. Consequently, AP 100 returns from the sleep state to a normal state. Subsequently, a normal wireless LAN operation is allowed between AP 100 and the STA. When the STA detects that AP 100 returns from the sleep state (for example, when receiving a predetermined signal, such as a beacon frame from AP 100), the STA stops transmitting the WUR packet. Here, the case of activating AP 100 from the STA has thus been described. Another mode can be adopted where after AP 100 is activated, STA sleeps and subsequently AP 100 activates the STA. In this mode, as with the AP, the STA is required to include an activator and a power source controller. This embodiment is hereinafter described further in detail.

Figure 3:
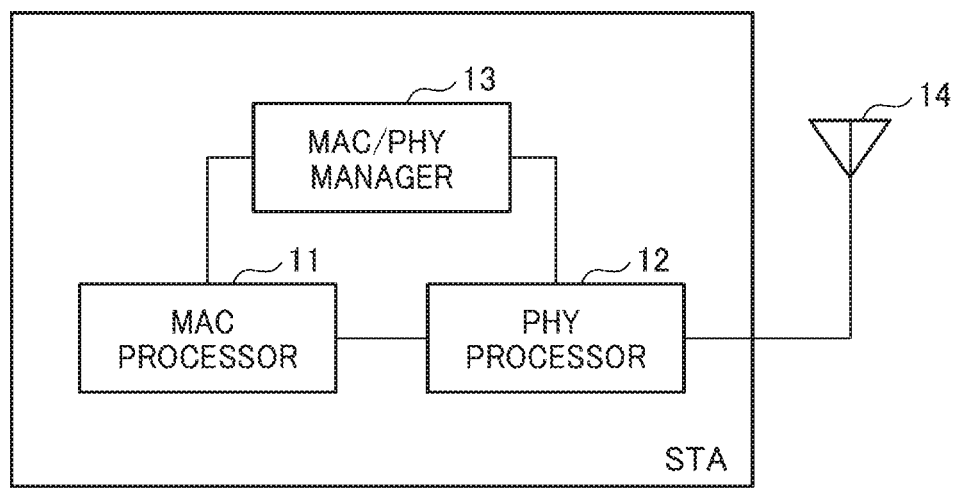
FIG. 3 is a functional block diagram of a wireless communication device mounted on a terminal according to this embodiment.

FIG. 3 is a functional block diagram of a wireless communication device mounted on the STA according to this embodiment.

As shown in FIG. 1, the wireless communication device mounted on the STA includes MAC processor 11, PHY (PHYsical) processor 12, MAC/PHY manager 13, and at least one antenna 14. This diagram shows a single antenna 14. Alternatively, multiple antennas may be provided.

MAC processor 11 is connected to an upper processor, not shown. The upper processor performs a process for an upper layer that is upper than the MAC (Medium Access Control) layer. The upper processor can exchange a signal with MAC processor 11. Typical examples of the upper layer may include TCP/IP, UDP/IP, and an application layer that is a layer further thereabove. However, this embodiment is not limited to these examples. The upper processor may include a buffer for exchanging data with the MAC layer and the upper layer. Connection may be secured to a wired infrastructure via the upper processor. The buffer may be a memory, an SSD, a hard disk or the like. In the case where the buffer is a memory, the memory may be a volatile memory, such as DRAM, or a nonvolatile memory, such as NAND or MRAM.

MAC processor 11 performs a process for the MAC layer, and further performs a process corresponding to MLME (MAC subLayer Management Entity) in IEEE 802.11 standard. As described above, MAC processor 11 can exchange a signal with the upper processor. Furthermore, MAC processor 11 can exchange a signal with PHY processor 12.

MAC processor 11 performs a transmission process and a reception process on the MAC layer. MAC processor 11 is connected to the upper processor, PHY processor 12 and MAC/PHY manager 13, and exchanges signals with these elements.

PHY processor 12 performs a process for the physical layer (PHY layer) (digital-domain process), and an analog process, and further performs a process corresponding to PLME (Physical Layer Management Entity) in IEEE 802.11 standard. PHY processor 12 performs the analog process. Consequently, PHY processor 12 includes an analog processor. Alternatively, the analog processor may be excluded therefrom, and arranged between antenna 14 and PHY processor 12 instead. PHY processor 12 is connected to antenna 14.

PHY processor 12 includes an analog/digital and digital/analog (AD/DA) converter and an RF (Radio Frequency) circuit, and converts a digital signal having been subjected to the process on the physical layer into an analog signal having a desired frequency and transmits the signal through antenna 14. PHY processor 12 converts a high-frequency analog signal received through antenna 14 into a digital signal.

MAC/PHY manager 13 is connected to the upper processor, not shown, MAC processor 11, and PHY processor 12. MAC/PHY manager 13 manages an MAC operation and a PHY operation in the wireless communication device.

The wireless communication device according to this embodiment can include (consolidate) antenna 14 as a configuration element in a single chip, thereby allowing the mounting area of antenna 14 to be small.

Upon receipt of the signal from a wireless medium, PHY processor 12 converts the analog signal received through antenna 14 into a baseband signal, which can be processed on the physical layer, and further converts the signal into a digital signal. PHY processor 12 detects the reception level of the digital signal. PHY processor 12 compares the detected reception level with a carrier sense level (threshold), and when the reception level is equal to or higher than the carrier sense level, PHY processor 12 outputs a signal indicating that the medium (CCA: Clear Channel Assessment) is busy to MAC processor 11. When the reception level is less than the carrier sense level, PHY processor 12 outputs a signal indicating that the medium (CCA) is idle to MAC processor 11.

PHY processor 12 applies a decoding (including error correction code decoding, demodulation, etc.) process and a process of removing a preamble and a PHY header to the received signal, and extracts the payload. According to IEEE 802.11 standard, this payload is called physical layer convergence procedure (PLCP) service data unit (PSDU) on the PHY side. PHY processor 12 sends the extracted payload to MAC processor 11, and MAC processor 11 handles it as a MAC frame. According to IEEE 802.11 standard, this MAC frame is called medium access control (MAC) protocol data unit (MPDU). In addition, PHY processor 12, when it started to receive the reception signal, notifies the fact of having started reception of the reception frame to MAC processor 11, and, when it completed the reception of the reception signal, notifies the fact of having completed the reception to MAC processor 11. Also, PHY processor 12, when the reception signal has been decoded successfully as the physical packet (PHY packet) (when it does not detect an error), notifies the completion of the reception of the reception signal and sends a signal indicative of the fact that the medium is in the idle state to MAC processor 11. PHY processor 12, when it detected an error in the reception signal, notifies the fact that the error has been detected with an appropriate error code in accordance with the error type to MAC processor 11. Also, MAC processor 11, at the timing at which the medium has been determined to enter the idle state, notifies a signal indicative of the fact that the medium is in the idle state to MAC processor 11.

MAC processor 11 receives transmission data from the upper processor, and passes reception data to the upper processor. According to IEEE 802.11 standard, the data in the MAC data frame called MSDU (Medium Access Control (MAC) Service Data Unit). MAC processor 11 receives an instruction from MAC/PHY manager 13, and appropriately interprets and executes the instruction.

MAC processor 11 is configured to handle three types of MAC frames, i.e., a data frame, a control frame, and a management frame, and carry out various processing procedures defined in the MAC layer. Here, the three types of MAC frames are described.

The management frames are used to manage a communication link with an AP or with other STAs. The management frames includes, for example, a beacon frame that notifies the group attribute and synchronization information in order to form a BSS. The management frames include also an association request frame used in an association process for allowing STA to join a BSS formed by an AP playing the main role (for establishing a wireless link with an AP), and a reassociation request frame used in a reassociation process. The frames also include a probe request frame used for searching for BSSs. A state where a certain STA has already exchanged information required to execute wireless communication with another STA is herein represented that the communication link has been established. Required information exchange includes, for example, notification on a function supported by the own STA terminal, negotiations pertaining to scheme setting and the like. The management frame is generated by MAC processor 11 on the basis of an instruction received from MAC/PHY manager 13.

MAC processor 11 receives various types of information from an AP or other STAs via the management frames.

The data frame is used for transmitting data to an AP or other STAs in the state where the communication link has been established with the AP or with the other STAs. For example, according to an application operation by the user, data is generated in a STA, and the data is transferred through the data frame. More specifically, the generated data is passed from the upper processor to MAC processor 11. MAC processor 11 includes the data into a frame body field and adds a MAC header to generate a data frame. PHY processor 12 then adds a physical header to the data frame to generate a physical packet, and transmits the physical packet through antenna 14. Upon receipt of the physical packet, PHY processor 12 performs a process on the physical layer on the basis of the physical header to extract the MAC frame (here, the data frame), and passes the data frame to MAC processor 11. When MAC processor 11 receives the data frame (grasps that the received MAC frame is the data frame), this processor extracts the information in the frame body field as data and passes the extracted data to the upper processor via MAC processor 11. As a result, operations in the application, such as data writing and reproduction, occur.

The control frames are used for control in cases of transmission to and reception from (exchange with) an AP or other STAs. The control frames are, for example, an RTS (Request to Send) frame, a CTS (Clear to Send) frame and the like, which are exchanged with other wireless communication devices for reserving the wireless medium before starting to exchange the management frame or the data frame. Other control frames include acknowledgement response frames for acknowledging received management frames or data frames. Examples of the acknowledgement response frames include an ACK (Acknowledgement) frame and a BA (BlockACK) frame. These control frames are generated by MAC processor 11. As for the control frame (the CTS frame, ACK frame, BA frame, etc.) transmitted as a response to the received MAC frame, MAC processor 11 determines the necessity of transmission of the response frame (control frame), and generates an appropriate control frame.

For transmitting the MAC frame on the basis of CSMA/CA (Carrier Sense Multiple Access with Carrier Avoidance), MAC processor 11 is required to obtain an access right (transmission right) on the wireless medium. MAC processor 11 manages carrier sense information, and manages the transmission timing on the basis of the carrier sense information. MAC processor 11, in accordance with the transmission timing, gives the transmission instruction to PHY processor 12, and further sends the MAC frame thereto. In addition to the transmission instruction, MAC processor 11 may instruct a modulation scheme and a coding scheme to be used in the transmission. In addition to them, MAC processor 11 may provide an instruction regarding the transmission power. When MAC processor 11, after having acquired the access right (transmission right), obtained the period of time during which the medium can be occupied (Transmission Opportunity; TXOP), then MAC processor 10 is allowed to continuously exchange the MAC frames with other wireless communication devices although there is some limitation based on such as the QoS (Quality of Service) attribute.

Carrier sense information includes both physical carrier sense information regarding busy/idle states of the medium (CCA) input from PHY processor 12 and virtual carrier sense information on the basis of the medium reservation time described in the received frame. If either one of these carrier sense information pieces indicates the busy state, then the medium is regarded as being in the busy state in which transmission is prohibited. It is considered here that in IEEE 802.11 standard, the medium reservation time is described in the Duration field in the MAC header. MAC processor 11, when having received a MAC frame that is addressed to other wireless communication devices (that is not addressed to the device itself), determines that the medium is virtually containing this MAC frame over the medium reservation time. A scheme of this type for virtually determining that a medium is in the busy state, or the term during which the medium is virtually regarded as being in the busy state is called Network Allocation Vector (NAV).

Here, the data frame may be a frame such that a plurality of MAC frames (i.e., MPDUs or sub-frames) are aggregated with each other or payload portions of a plurality of MAC frames are aggregated with each other. The former data frame is called an A (Aggregated)-MPDU and the latter data frame is called an A (Aggregated)-MSDU (MAC service data unit) in IEEE 802.11 standard. In the case of the A-MPDU, a plurality of MPDUs are aggregated with each other within the PSDU. In a case where the data frame is A-MPDU or the like, responses to multiple MAC frames are comprehensively transmitted. For the response in this case, the BA (BlockACK) frame is used instead of the ACK frame.

MAC/PHY manager 13 performs a process corresponding to SME (Station Management Entity) in IEEE 802.11 standard. In this case, the interface between MAC/PHY manager 13 and MAC processor 11 corresponds to MLME_SAP (MAC subLayer Management Entity Service Access Point) in IEEE 802.11 standard. The interface between MAC/PHY manager 13 and PHY processor 12 corresponds to PLME_SAP (Physical Layer Management Entity Service Access Point) in IEEE 802.11 wireless LAN.

FIG. 1 illustrates MAC/PHY manager 13 such that a functional unit for MAC management and a functional unit for PHY management are consolidated. Alternatively, these units may be separately implemented.

MAC/PHY manager 13 holds a management information base (Management Information Base: MIB). The MIB holds various types of information about the capability of the own STA or the validity of various functions. For example, the MIB may hold information on the presence or absence of the capability (function) of transmitting the WUR signal or WUR packet for activating an AP (WUR signal transmission capability information). A memory for holding and managing the MIB may be internally included in MAC/PHY manager 13. Alternatively, the memory is not necessarily included in MAC/PHY manager 13 and may be separately provided instead. In the case where the memory for holding and managing the MIB is provided separately from MAC/PHY manager 13, MAC/PHY manager 13 can refer to the separately provided memory and rewrite rewritable parameters in the memory. MAC/PHY manager 13 may notify information on the transmission capability information and the like in the MIB, to the AP.

MAC/PHY manager 13 may obtain, from an AP, information pertaining to whether the AP has a capability of transitioning to the sleep state and then being activated upon receipt of the WUR packet. In this case, MAC/PHY manager 13 can store the information pertaining to the AP in the MIB, and refer to and rewrite the information. Alternatively, the memory for storing the information may be held and managed separately from the MIB.

MAC/PHY manager 13 may manage a modulation scheme and a transmission rate that are to be applied to the WUR signal. In this embodiment, an OOK (On-Off Keying) modulation is assumed as a WUR signal modulation scheme.

MAC/PHY manager 13 performs a process with the AP; the process pertains to a negotiation for registering the own device to the AP. Registration of the own device allows the AP to be activated through transmission of the WUR packet containing the WUR signal from the own device in a case where the AP has transitioned to the sleep state. A STA that performs the registration to the AP is required to have a WUR signal transmission capability. The management frame described above may be used for the negotiation process. The existing management frame (association request frame, etc.) may be used. Alternatively, a newly defined management frame may be used. Through the negotiation with the AP, the WUR signal used for activation may be determined. In a case where the WUR packet is transmitted multiple times, the transmission duration length for transmission may be determined. The WUR signal transmission rate may be determined. MAC/PHY manager 13 stores the information determined through the negotiation into the MIB or another memory to allow the information to be referred to. In a case where the WUR signal is managed according to an identifier, such as an index number, the identifier of the WUR signal may be stored.

When MAC/PHY manager 13 determines that there is not any AP therearound to which this manager intends to connect, this manager determines that there is a possibility that the AP is sleeping, and transmits the WUR packet containing the WUR signal using PHY processor 12 and MAC processor 11. PHY processor 12 modulates the WUR signal according to a predetermined modulation scheme. For example, the OOK (On-Off Keying) modulation is used. The OOK modulation is a type of modulation scheme that represents digital data by means of presence and absence of carrier waves. The OOK modulation can be performed using an OFDM transmitter, for example. In this case, one bit may correspond to one piece of OFDM signal duration. As described later, the WUR packet contains a legacy preamble. Instead of OOK, a fixed modulation scheme defined by a standard may be used therefor.

If there is a piece of information which is among the pieces of information described above and for which notification of another piece of information makes this piece necessary, the notification can be omitted. For example, in a case where a capability conforming to a certain new standard or specification is defined and conformity thereto automatically means that the WUR signal transmission capability is held, explicit notification on the presence of the WUR signal transmission capability is not required.

PHY processor 12 may be separated into a section for normal communication and a section of transmitting the WUR signal (or the WUR packet). In this case, the analog processor may be common to both the sections. Alternatively, analog processors are separately provided for the respective sections, and the frequencies to be used may be set different from each other.

MAC processor 11, MAC/PHY manager 13, and sections of PHY processor 12 that are other than the analog processor, correspond to one mode of a communication processing device or a baseband integrated circuit that performs a process pertaining to communication with another AP. The analog processor corresponds to one mode of an RF (Radio Frequency) integrated circuit that transmits and receives signals through antenna 14, for example. In another view, for example, MAC processor 11 and PHY processor 12 correspond to a wireless communicator that transmits and receives a signal or a packet. MAC/PHY manager 23 corresponds to controlling circuitry or a controller that controls the wireless communicator. The function of the communication processing device or the baseband integrated circuit may be performed by software (program) operated in a processor, such as CPU, by hardware, or by both software and hardware. The software may be stored in a storage medium that is a memory, such as ROM or RAM, a hard disk, or an SSD, and be read and executed by the processor. The memory may be a volatile memory, such as DRAM, or a nonvolatile memory, such as NAND or MRAM.

Figure 4:
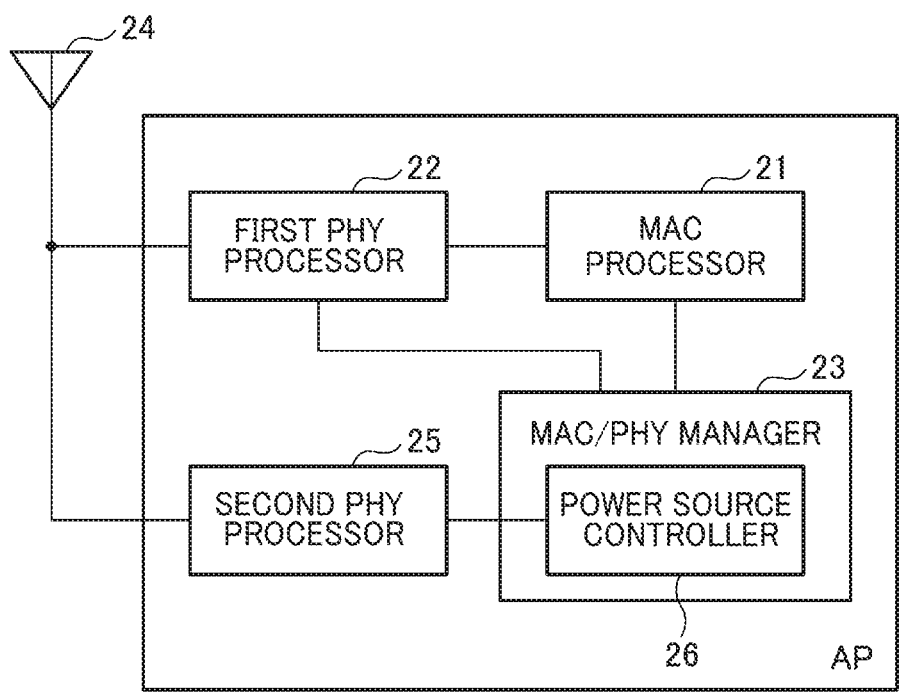
FIG. 4 is a functional block diagram of a wireless communication device mounted on an access point (AP) according to this embodiment.

FIG. 4 is a functional block diagram of a wireless communication device mounted on an AP according to this embodiment.

As shown in FIG. 4, the wireless communication device mounted on an AP includes MAC processor 21, first PHY (PHYsical) processor 22, MAC/PHY manager 23, second PHY processor 25, and at least one antenna 24. MAC/PHY manager 23 includes power source controller 26. This diagram shows a single antenna 24. Alternatively, multiple antennas may be provided.

The major difference from a STA in FIG. 3 is in that second PHY processor 25 and power source controller 26 are included. The description of functions redundant with a STA in FIG. 3 is omitted. The difference is mainly described.

MAC processor 21 is connected to an upper processor, not shown, and performs an operation with the upper processor; this operation is analogous to the case of a STA.

MAC processor 21 performs a process for the MAC layer, and further performs a process corresponding to MLME in IEEE 802.11 standard. MAC processor 21 can exchange a signal with the upper processor. Furthermore, MAC processor 21 can exchange a signal with first PHY processor 22.

MAC processor 21 performs a transmission process and a reception process on the MAC layer. MAC processor 21 is connected to the upper processor, first PHY processor 22 and MAC/PHY manager 23, and exchanges signals with these elements.

First PHY processor 22 performs a process for the physical layer (PHY layer) (digital-domain process) and an analog process, and further performs a process corresponding to PLME in IEEE 802.11 standard. First PHY processor 22 performs the analog process. First PHY processor 22 thus includes an analog processor. Alternatively, the analog processor may be excluded therefrom, and arranged between antenna 24 and first PHY processor 22. First PHY processor 22 is connected to antenna 24. The details of the analog process are analogous to those in the case of a STA.

MAC/PHY manager 23 is connected to the upper processor, not shown, MAC processor 21, and first PHY processor 22. MAC/PHY manager 23 manages an MAC operation and a PHY operation in the wireless communication device. MAC/PHY manager 23 performs a process corresponding to SME in IEEE 802.11 standard.

The wireless communication device according to this embodiment includes (consolidates) antenna 24 as a configuration element in a single chip, thereby allowing the mounting area of antenna 24 to be small.

The operation of the analog processor of first PHY processor 22, the process on the physical layer, and the operation for MAC processor 21 upon receipt of the signal from the wireless medium are analogous to those in the case of a STA.

MAC processor 21 receives transmission data from the upper processor, and passes reception data to the upper processor. MAC processor 21 receives an instruction from MAC/PHY manager 23, and appropriately interprets and executes the instruction.

MAC processor 21 deals with three types of MAC frames that are the data frame, control frame, and management frame, and performs various processes defined on the MAC layer. The description of the data frame, control frame, and management frame are analogous to the description at a STA.

MAC processor 21 receives various types of information from other STAs through the management frames. MAC processor 21 may notify various types of information through the management frames to a STA. The management frames used for the notification may be, for example, a beacon frame, a probe response frame, an association response frame and the like.

MAC processor 21 manages carrier sense information. For transmitting the MAC frame on the basis of CSMA/CA, this processor is required to obtain an access right (transmission right) to the wireless medium. The details of the carrier sense information, transmission right obtainment, and transmission operation after the obtainment are analogous to those in the case of a STA.

FIG. 4 illustrates MAC/PHY manager 23 such that a functional unit for MAC management and a functional unit for PHY management are consolidated. Alternatively, these units may be separately implemented.

MAC/PHY manager 23 holds a management information base (Management Information Base: MIB). The MIB holds various types of information about the capability of the own AP or the validity of various functions. For example, the MIB may hold information on whether own AP has a capability (sleep supporting function) of transitioning to the sleep state and then be activated upon reception of the WUR signal or WUR packet. The memory implementation mode for holding and managing the MIB can encompass variations analogous to the case of a STA.

MAC/PHY manager 23 may obtain information pertaining to whether a STA has a WUR signal transmission function, from the STA belonging to the own BSS. In this case, MAC/PHY manager 23 can store the information pertaining to the STA in the MIB, and refer to and rewrite the information. Alternatively, the memory for storing the information pertaining to the STA may be held and managed separately from the MIB.

MAC/PHY manager 23 performs a process with the STA that has the WUR signal transmission function; the process pertains to a negotiation for registering the STA to the own AP. Registration of the STA allows the main radio unit (e.g., first PHY processor 22 and MAC processor 21) of the own AP to be activated through transmission of the WUR packet containing the WUR signal from STA in a case where the own AP has transitioned to the sleep state. The management frame may be used for the negotiation procedures. The existing management frame (association request frame, etc.) may be used. Alternatively, a newly defined management frame may be used.

For the negotiation with the STA, the WUR signal used for activation may be determined. Determination of the WUR signal may be made by determining all the values (bits) constituting the WUR signal, by determining the format of the WUR signal, or by determining the format and the values of some fields thereof. In a case where the WUR packet is transmitted multiple times, the transmission duration length for transmission may be determined. The WUR signal transmission rate may be determined.

MAC/PHY manager 23 stores the information determined through the negotiation into the MIB or another memory to allow the information to be referred to. It is desired that the stored information be stored in a format that can be referred to by second PHY processor 25 described later. MAC/PHY manager 23 may manage multiple WUR signals. The WUR signal may be stored in association with the identifier, such as the index number, in a format of a table or the like.

If there is a piece of information for which notification of another piece of information makes this piece necessary to have a certain function (e.g., the sleep supporting function), the notification can be omitted. For example, in a case where the capability conforming to certain a new standard or specification is defined and conformity therewith automatically means that the sleep supporting function according to this embodiment is provided, it is not necessarily explicitly notified that the terminal supports this function.

Power source controller 26 controls power supply to the main radio unit. The main radio unit can be defined in various manners. In this embodiment, the main radio unit includes first PHY processor 22 and MAC processor 21. Alternatively, the main radio unit may be defined to include only first PHY processor 22, or may be defined to include first PHY processor 22, MAC processor 21, and MAC/PHY manager 23 (note that power source controller 26 may be excluded). The main radio unit is also called a main radio, or primary connectivity radio.

Stop or suppression of power supply to first PHY processor 22 and MAC processor 21 can cause first PHY processor 22 and MAC processor 21 to transition to the sleep state. This can facilitate power saving. An example of suppressing power supply is stop of power supply to a great part or a part of the main radio unit, instead of the entire thereof. Alternatively, reduction in operation speed, such as reduction in the number of clocks of the processor, may be included. Here, both first PHY processor 22 and MAC processor 21 are caused to be in the sleep state. Alternatively, only first PHY processor 22 may be caused to be in the sleep state but MAC processor 21 may be kept in a state of always being operable.

In a case where all predefined conditions are satisfied, that is, a case where it is determined that no communication is performed with any of the preregistered STA, power source controller 26 outputs a sleep instruction, thereby causing the main radio unit (first PHY processor 22 and MAC processor 21) to transition to the sleep state. Examples of determination that no communication with the preregistered STAs has been performed may include, for example, a case where communication has been performed with none of preregistered STAs for at least a certain duration, and a case where all preregistered STAs are disassociated. It can be considered that an example of a specific situation where communication is performed with none of preregistered STAs is a situation where all the users caring respective STAs are out in a case of home use. A situation may be considered where power of each of STAs is entirely off.

Many variations can be adopted as a method of causing the main radio unit to transition to the sleep state. For example, power source controller 26 may output a sleep instruction to MAC processor 21. MAC processor 21 having received the sleep instruction may output this sleep instruction to first PHY processor 22, confirm that first PHY processor 22 has transitioned to the sleep state, and subsequently own processor 21 may transition to the sleep state. On the contrary, power source controller 26 may output a sleep instruction to first PHY processor 22. First PHY processor 22 having received the sleep instruction may output this sleep instruction to MAC processor 21, confirm that first MAC processor 21 has transitioned to the sleep state, and subsequently own processor 22 may transition to the sleep state. Alternatively, in a case where the target of sleep control is only first PHY processor 22, a sleep instruction may be output directly to first PHY processor 22, or a sleep request may be output to MAC processor 21, and MAC processor 21 may provide a sleep instruction for first PHY processor 22 to thereby causing first PHY processor 22 to transition to the sleep state through MAC processor 21.

Power source controller 26 is a part of MAC/PHY manager 23. Alternatively, this controller may be separated from MAC/PHY manager 23. In this case, the MAC/PHY manager 23 may be adopted as a target of the sleep control.

Upon receipt of a notification on an activation request issued by second PHY processor (activator) 25 described later, power source controller 26 outputs an instruction to return from sleep (activation instruction) to the main radio unit (here, first PHY processor 22 and MAC processor 21) to thereby cause the main radio unit to return from the sleep state. Thus, first PHY processor 22 and MAC processor 21 are returned to a state capable of normal communication.

There are various methods for returning from the sleep state. For example, the instruction to return from sleep may be output to MAC processor 21, and activated MAC processor 21 may output the instruction to return from sleep to first PHY processor 22, thereby returning (activating) MAC processor 21 and first PHY processor 22 in this order. Alternatively, the instruction to return from sleep may be output to first PHY processor 22, and activated first PHY processor 22 may output the instruction to return from sleep to MAC processor 21, thereby returning first PHY processor 22 and MAC processor 21 in this order. Alternatively, in a case where the target of sleep control is only first PHY processor 22, an instruction to return from sleep may be output to MAC processor 21, and MAC processor 21 may provide first PHY processor 22 with the instruction to return from sleep to thereby activating first PHY processor 22.

Upon receipt of the WUR packet containing the WUR signal for activating the main radio unit via antenna 24, second PHY processor (activator) 25 decodes and analyzes the WUR packet. Second PHY processor 25 performs at least a process on the PHY layer, and may have a function of performing a process on the MAC layer. Second PHY processor 25 determines whether to activate the main radio unit (the first PHY processor 22 and MAC processor 21). For example, in a case where the WUR signal contained in the activation packet coincides with the WUR signal predetermined through the negotiation, it is determined to activate the main radio unit. On the contrary, in a case without coincidence, it is determined not to activate the main radio unit. After the determination of activation, an activation request notification is output to power source controller 26. Unlike the main radio unit, second PHY processor 25 is not the target of the sleep control. Consequently, even in a case where the main radio unit is in the sleep state incapable of receiving a packet for communication, second PHY processor 25 can receive the WUR packet. It is assumed that second PHY processor 25 has only a reception function but does not have a transmission function. However, second PHY processor 25 may have the transmission function.

Second PHY processor 25 may be also called Wake-Up Radio, Wake-Up Receiver (WUR), or Low-Power WUR (LP-WUR).

MAC processor 21, MAC/PHY manager 23, sections of first PHY processor 22 other than the analog processor, and sections of second PHY processor 25 that are other than the section for analog processes, correspond to, for example, one mode of the communication processing device or the baseband integrated circuit that performs a process pertaining to communication with a STA. The analog processors of the first and second PHY processors correspond to one mode of an RF (Radio Frequency) integrated circuit that transmits and receives signals through antenna 24, for example. In another view, for example, MAC processor 21 and first PHY processor 22 correspond to a wireless communicator that transmits and receives a signal or a packet for communication. Second PHY processor 25 corresponds to the receiver. MAC/PHY manager 23 and power source controller 26 correspond to the controller that controls the wireless communicator. The function of the communication processing device or the baseband integrated circuit may be performed by software (program) operated in a processor, such as CPU, by hardware, or by both software and hardware. The software may be stored in a storage medium that is a memory, such as ROM or RAM, a hard disk, or an SSD, and be read and executed by the processor. The memory may be a volatile memory, such as DRAM, or a nonvolatile memory, such as NAND or MRAM.

The WUR signal and the WUR packet are hereinafter described. Before the description, the configuration of a packet (PPDU) used for normal communication (communication other than WUR packet transmission) between the STA and AP/STA is preliminarily described.

FIG. 5A shows a format example of the packet used for normal communication. The packet used for normal communication contains a legacy preamble field, and a payload for storing the MAC frame. A preamble field conforming to a standard, such as IEEE 802.11n/ac/ax, may be arranged between the legacy preamble field and the payload. The legacy preamble field contains L-STF, L-LTF and L-SIG. L-STF, L-LTF and L-SIG are fields recognizable by legacy terminals in conformity with IEEE 802.11a or the like (the beginning "L" represents "legacy"), and contain information on signal detection, frequency correction, transmission rate (or MCS (Modulation and Coding Scheme)) and the like.

FIG. 5B shows a format example of a MAC frame. The data frame, management frame, and control frame basically have such a frame format. This frame format includes fields that are MAC header, Frame body field, and FCS field.

The MAC header includes fields which are Frame Control field, Duration field, Address 1 field, Address 2 field, Address 3 field, Sequence Control field, QoS Control field and HT (High Throughput) Control field. Not all of these fields necessarily reside. Alternatively, some fields do not reside in some cases. Another field that is not shown in the diagram may reside. For example, Address 4 field may further reside.

The Address 1 field stores therein a Receiver Address (RA). The Address 2 field stores therein a Transmitter Address (TA). The Address 3 field stores therein a BSSID (Basic Service Set IDentifier) which is the identifier of a BSS (in some cases, all the bits are set to 1 for all the BSSIDs as targets; wildcard BSSID) or a TA, according to the usage of the frame.

In the Frame Control field, two fields that are Type and Subtype are set. Broad discrimination among the data frame, management frame and control frame is made according to the Type field. Narrow discrimination in the broadly discriminated frames, for example, identification of the probe request frame or a beacon frame is made according to the Subtype field.

In the Duration field, the medium reservation period is described, as described above. In the Sequence Control field, the sequence number of data to be transmitted, and the fragment number in a case where the data is fragmented are set. The QoS field is used for QoS control that is for transmission in consideration of the precedence of the frame. The HT Control field is a field introduced in IEEE 802.11n. The HT Control field resides in a case where the frame is a QoS frame or a management frame and the order field is set to one. The HT Control field is extendable to VHT (Very High Throughput) Control field and also to HE (High Efficiency) Control field. Notification can thus be made according to various functions of IEEE 802.11n, IEEE 802.11ac or IEEE 802.11ax.

In the FCS field, FCS (Frame Check Sequence) information is set as a checksum symbol used to detect an error in the frame on the receiver side. An example of FCS information may be CRC (Cyclic Redundancy Code) or the like.

Figure 6A:
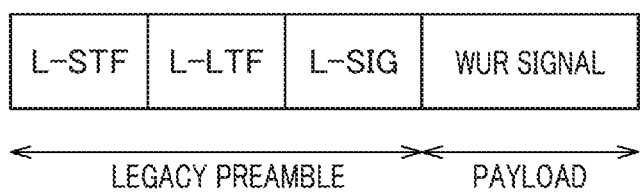
FIG. 6A is a diagram showing a format example of a packet for activation (WUR packet)
Figure 6B:
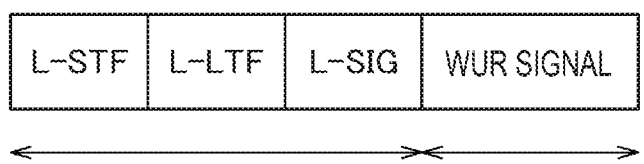
FIG. 6B is a diagram showing a format example of a packet for activation (WUR packet)
Figure 6C:
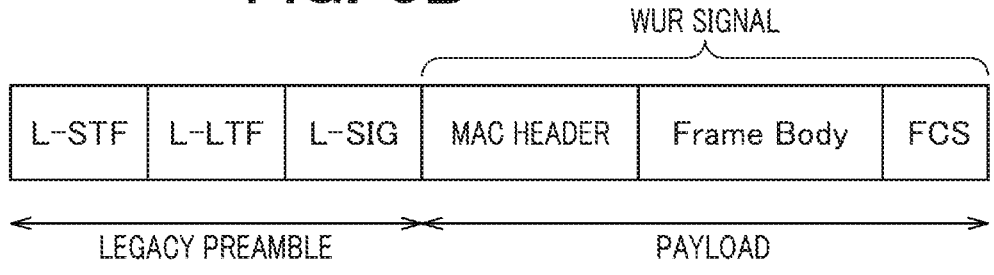
FIG. 6C is a diagram showing a format examples of packet for activation (WUR packet)

FIGS. 6A to 6C show format examples of WUR packets. The WUR packet has a configuration in conformity with the PHY format of a wireless LAN standard. That is, the WUR packet containing the WUR signal is transmitted using a wireless LAN signal. The WUR signal is a signal conforming to a modulation scheme that transmits information mainly by means of the strength of carrier waves, such as an OOK signal, ASK (Amplitude-Shift Keying) signal, AM (Amplitude Modulation) signal, or PPM (Pulse Position Modulation) signal.

FIG. 6A shows an example where the WUR signal is stored in the payload subsequent to the legacy preamble. An extended field conforming to the wireless LAN standard to be used may be arranged between the legacy preamble and the payload. For example, the SU (Single User) format in IEEE 802.11ax standard may be used. In this case, the WUR signal is arranged in the payload of the SU format. The legacy preamble is processed on the physical layer. According to the IEEE 802.11 wireless LAN standard, the payload is called a PSDU in the PHY layer as described above. The payload corresponds to an MPDU described above when being passed from the MAC layer to the PHY layer. Consequently, the payload is regarded to be dealt with on the MAC layer, and is thus processed on the MAC layer. What is stored in the payload may be represented as Wake-Up frame or the WUR frame. Alternatively, a mode can be considered where the WUR signal stored in the payload is processed on the physical layer.

The WUR signal is not limited to a specific one. The WUR signal may be the MAC frame (see FIG. 6C), what is obtained by adding a predetermined preamble before the beginning of the MAC frame, or a signal conforming to another format. For example, a value (bit sequence) having a predetermined length is determined through a negotiation between a STA and an AP; the signal may be a signal that contains the thus determined signal. Alternatively, the signal may be a signal that contains not only the value of the predetermined length but also the MAC address (BSSID) of the AP that is an activation target. The WUR signal may have any content only if the content is recognizable commonly between the STA and the AP. The WUR signal may contain the MAC address (or AID or a part of AID) of the transmission source of the WUR signal.

In FIG. 6B, after the legacy preamble field, a new preamble field (preamble field for WUR) is arranged. The WUR signal is arranged in this new preamble field. The preamble for WUR is a part of the physical header, and is processed at the physical layer.

FIG. 6C shows an example where the MAC frame is arranged in the payload after the legacy preamble field. The MAC frame contains a MAC header, a frame body field, and an FCS field. The MAC header may have a configuration analogous to that in FIG. 5B, or a simplified configuration. For example, the header may only have Address 1 field (RA field). The other fields may be omitted, or dummy values may be set in the other fields. A field for the identifier (index number or the like) of the WUR signal may be provided. In a case where the value of the predetermined length (bit sequence) is determined through a negotiation, the value of the predetermined length may be set in the frame body field. Alternatively, other information to be notified to the receiving device may be set in the frame body field. For example, in a case where an AP can be activated as a STA or an AP as described later, instruction information that designates whether to activate the device as an AP or a STA may be set. The instruction information may be set in the MAC header instead of the frame body field, or set in the preamble for WUR of the physical header.

The configurations shown in FIGS. 6A to 6C are examples. Other various formats may be adopted. For example, a predetermined preamble may be arranged immediately before the MAC header in the payload in FIG. 6C. The predetermined preamble may be used to notify that the MAC frame is stored after the predetermined preamble, for example.

As the same with first PHY processor 22, second PHY processor 25 includes an analog processor that applies an analog process to a received signal. Second PHY processor 25 applies the analog process to the received signal and decodes the signal to thereby obtain the packet, and determines whether the received packet is the WUR packet. Second PHY processor 25 performs a process on the PHY layer which processes the physical header of the packet, and a process on the MAC layer which processes the payload. When the received packet is the WUR signal (for example, when the packet coincides with the format of the WUR packet, or when a flag indicating that the packet is the WUR packet is set), it is determined whether to activate the main radio unit, on the basis of the WUR signal contained in the WUR packet. As a simple example, when the WUR format includes a field in which a value predetermined through a negotiation is set, it is determined whether the value of the extracted WUR signal coincides with the value determined through the negotiation. In a case of coincidence, it is determined to activate the main radio unit. Alternatively, in a case where the WUR signal contains the address of an activation target, it is determined to activate the main radio unit when the address contained in the WUR signal coincides with the address of the own AP. In a case where multiple WUR signals reside, it may be identified which one of the WUR signals received this time is (or which format) on the basis of the identifier (index number) contained in the WUR signal, for example. According to the identified WUR signal, it may be determined whether the WUR signal received this time satisfies the activation condition. When it is determined to activate the main radio unit, second PHY processor 25 outputs an activation request notification to power source controller 26. Power source controller 26 having received the activation request notification activates the main radio unit.

Second PHY processor 25 does not have a transmission function. Consequently, no acknowledgement response frame is required to be transmitted to the transmission source even when success (failure) in reception of the packet is determined. Alternatively, the transmission function may be added to second PHY processor 25, which may transmit the acknowledgement response frame to the transmission source according to the determination result of the reception.

The frequency band of second PHY processor 25 may be different from the frequency band used by first PHY processor 22. The analog processor included in second PHY processor 25 may be commonly shared with first PHY processor 22. In this case, the analog processor cannot sleep.

Figure 7:
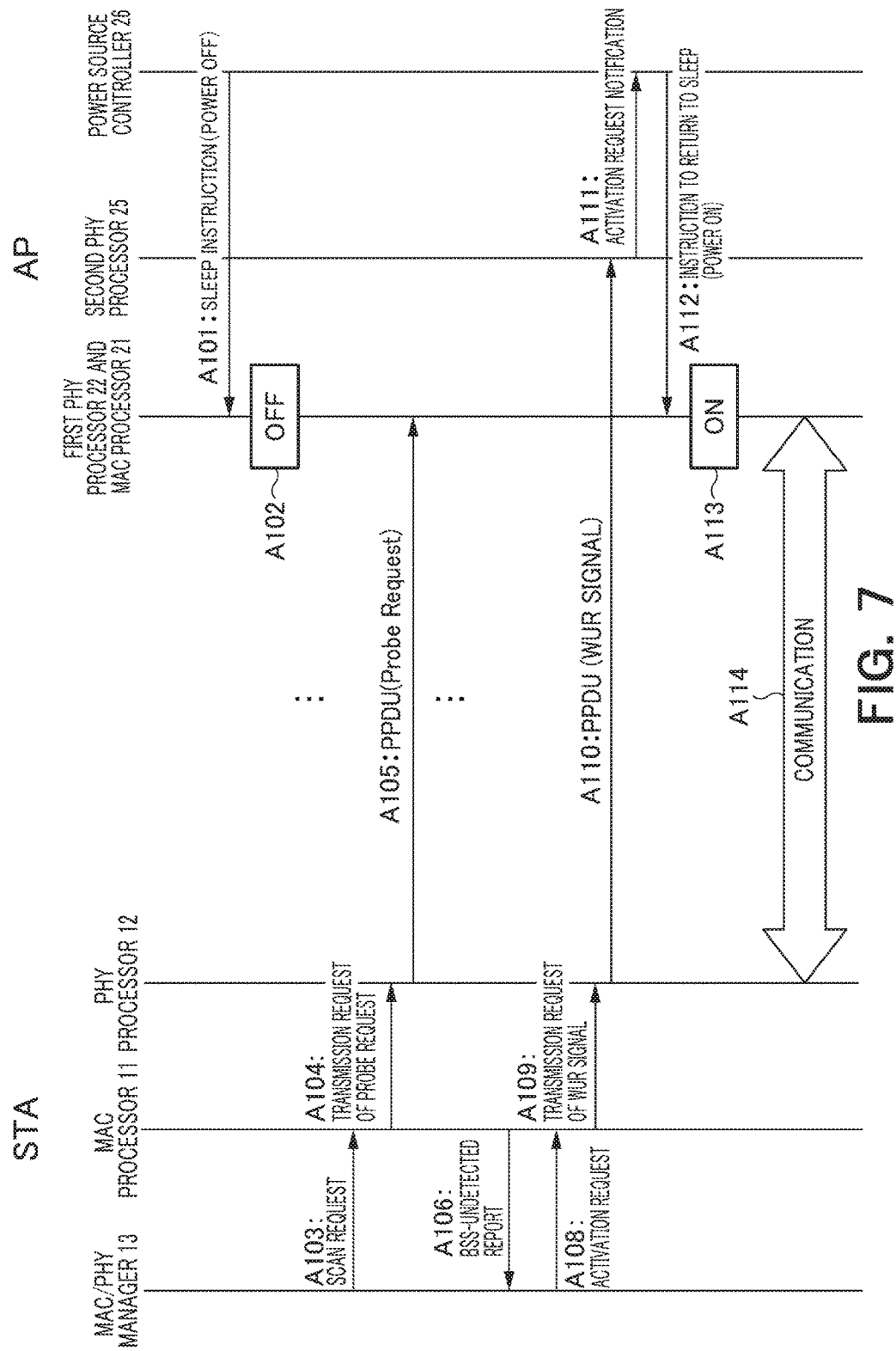
FIG. 7 is a diagram of an example of a communication sequence between the terminal and the access point according to this embodiment.

FIG. 7 is a sequence diagram of the operation of the wireless LAN system according to this embodiment.

When power source controller 26 of MAC/PHY manager 23 of the AP detects that communication is performed with none of the preregistered STAs, this controller outputs the sleep instruction to the main radio unit (first PHY processor 22 and MAC processor 21) (A101). The determination that no communication is performed with the predetermined STAs can be made according to the fact that the frame exchange with the predetermined STAs is not performed for a fixed period, for example. Alternatively, it may thus be determined when the AP disconnects the wireless link with every preregistered STA. When it is determined that at least one of the preregistered STAs communicates, no sleep instruction is output.

Upon receipt of the sleep instruction, first PHY processor 22 and MAC processor 21 transition to the sleep state. That is, power supply to first PHY processor 22 and MAC processor 21 is stopped or suppressed (A102). Consequently, first PHY processor 22 does not perform operations including packet transmission and reception (including the analog process and carrier sense) and packet generation. MAC processor 21 does not perform operations including frame transmission and reception and frame generation. Even after first PHY processor 22 and MAC processor 21 transition to the sleep state, second PHY processor 25 is left activated (power on). As described above, various methods of transitioning to the sleep state can be adopted. Any method can achieve the transition.

In a case where the user of the STA comes home (for example, returning home may be determined by grasping position information using GPS or wireless LAN) or turns on the power of the STA and the STA determines that the state is a state without connection to any AP, the STA transmits a probe request frame for searching for an AP. More specifically, MAC/PHY manager 13 of the STA outputs a scan request to MAC processor 11 (A103). Upon receipt of the scan request, MAC processor 11 generates a probe request frame, and outputs a transmission request of the frame to PHY processor 12 (A104). Upon receipt of the transmission request, PHY processor 12 generates a packet (PPDU) containing the probe request frame stored in the payload, and transmits the packet (A105).

The packet may be transmitted one or more times. In the case of transmitting the packet multiple times, the number of time of transmission may be predetermined. Alternatively, MAC processor 11 or MAC/PHY manager 13 may set a timer to a predetermined value and activate this timer, and repetitively transmit the packet until the timer reaches the value. In a case where there are a plurality of possible channels that can be used by the AP with which connection is intended, the channel may be switched and the packet may be transmitted in each channel. Here, active scan that transmits a probe request frame is performed. Alternatively, passive scan may be adopted that passively observes reception of a beacon frame. In active scan or passive scan, the STA may designate an AP with which the negotiation has been made. However, if there is no STA in a communication range of the AP with which the negotiation has been made, this AP may be scanned (searched for) in vain. Consequently, it is desired not to designate an AP with which the negotiation has been made in a case where the STA is specifically allowed to be connected to any BSS. In a case where an AP is not designated through active scan, the broadcast address is used as the transmission destination address of the probe request frame. When the STA determines that a response frame to the probe request frame is not received or the AP (BSS) intended to be connected with cannot be detected, MAC processor 11 outputs a BSS-undetected report to MAC/PHY manager 13 (A106).

MAC/PHY manager 13 determines that there is a possibility that the AP is in the sleep state, generates a request for activating the registered AP, and outputs the request to MAC processor 11 (A108). MAC processor 11 outputs a transmission request of the WUR signal for activating the AP to PHY processor 12 (A109). In this case, according to a certain configuration of the WUR packet, information to be contained in the payload of the WUR packet (MAC frame etc.) is also output. For example, a MAC frame is generated that contains a MAC header having a transmission destination address field in which the MAC address (BSSID) of the registered AP is set. If there is other information required to be set in the MAC header or the frame body field (e.g., a specific value (bit sequence) determined through the negotiation, etc.), the information is also set.

PHY processor 12 generates the WUR packet (PPDU) containing the WUR signal, and transmits the packet (A110), on the basis of the transmission request of the WUR signal. The WUR packet is transmitted in conformity with CSMA/CA in a manner analogous to the case of a packet for normal communication. That is, the state of the wireless medium is confirmed on the basis of the backoff algorithm before transmission. When the wireless medium is in the idle state, an access right is obtained, and the WUR packet is transmitted.

The WUR packet is transmitted one or more times. In the case of multiple times, predetermined number of times of transmission may be performed, or transmission may be repetitively performed within predetermined transmission duration (predetermined period) length. The MAC/PHY manager may contain either one of the number of times of transmission or the transmission duration length as a parameter in the activation request. Limitation of the number of times of transmission or the transmission duration length can prevent the power consumption from increasing owing to useless operation continuing beyond necessity in a case where the registered AP does not reside in a communicable range in actuality. Furthermore, interference with another system therearound can also be prevented.

According to another method of controlling the number of times of WUR packet transmission, MAC/PHY manager 13 may set a timer to a predetermined value and activate the timer when outputting an activation request, and output a transmission stopping request of WUR packet when the timer reaches the value, and MAC processor 11 may control so as to stop the WUR packet transmission on the basis of the request. In a case where there are multiple WUR signals and the WUR signals are selectively used, MAC/PHY manager 13 may include, into the activation request, the identifier of the WUR signal to be transmitted as a parameter, and PHY processor 12 may generate the WUR packet containing the WUR signal whose identifier has been set. In this case, at the AP side different identifiers (index numbers) to the respective WUR signals are preliminarily assigned in the information management base (MIB), thereby allowing the WUR signal to be identified. The AP preliminarily notifies the WUR signal's identifier to be used, to the STAs.

The main radio unit (here, both the first PHY processor and the MAC processor) at the AP is in the sleep state and can receive no packet. Consequently, this AP does not respond to the probe request frame from the STA. On the other hand, even while the main radio unit is in the sleep state, second PHY processor 25 of the AP is supplied with power source and can perform a reception operation. Upon receipt of the WUR packet through antenna 24, second PHY processor 25 decodes the WUR packet. For example, the legacy preamble is processed, and subsequently the WUR signal arranged thereafter is decoded (for example, OOK-decoded). It is determined whether the WUR signal satisfies the condition predetermined through the negotiation (for example, whether a specific value determined through the negotiation is included, or whether the transmission destination address coincides with the address of the own AP). When the condition is satisfied, the activation request notification is output to power source controller 26 (A111). When the condition is not satisfied, no activation request notification is output. Consequently, the AP is prevented from being activated by non-registered STAs.

Upon receipt of the activation request notification, power source controller 26 outputs an instruction to return from sleep to the main radio unit (first PHY processor 22 and MAC processor 21) to activate (awake) the main radio unit. Thus, the main radio unit is activated (A113). Subsequently, the AP starts normal communication not only with the STA having transmitted the WUR packet but also with the other STAs (A114). Various methods of returning from the sleep state may be adopted, as described above, and can achieve the returning.

<Details of Negotiation Between the AP and the STA (Preregistration of the STA at the AP)>

As described above, to allow the AP to sleep and then be activated upon receipt of the WUR signal, the preliminary negotiation is required between the AP and the STA to register the STA at the AP. The negotiation requires the AP to notify that the AP has the sleep supporting function according to this embodiment (the AP can sleep and then be activated by the WUR signal, the AP supports reception of the WUR signal, or the AP contains the activator) to the STA. The STA is required to notify that the STA has the WUR signal transmission function according to this embodiment (capability of transmitting the WUR signal) to the AP.

For example, the notification on presence of the sleep supporting function may be made through a management frame, such as a beacon frame or a probe response frame. On the other hand, the STA can notify that the STA has the WUR signal transmission function according to this embodiment (capability of transmitting the WUR signal) through a management frame, such as an association request frame. For example, in the fields for notifying various capabilities, a subfield for storing therein information pertaining to the notification is provided, and the information is stored in the subfield, thereby allowing the AP and the STA to issue these notifications. It is sufficient that the subfield has one bit, where 1 may indicate support and 0 may indicate non-support.

In the management frame, one or more information elements (Information element; IE) assigned the unique Element IDs (IDentifier) can be set in the Frame Body field. For example, the sleep supporting function or WUR signal transmission function, described above, may be notified through the information element. FIG. 8A shows a format example of the information element. The information element includes fields that are Element ID field, Length field, and Information field. The information element is identified by the Element ID. The Information field stores therein the content of information to be notified. The Length field stores therein information on the length of the Information field. For example, WUR Capabilities element is defined (i.e., a new Element ID is defined), the fact that the function described above is supported is stored in the Information field of the element. Alternatively, on the basis of the existing extended standard, for example, IEEE 802.11ax, the fact that the function described above is supported may be stored in a field that is used by such standard in order to notify the capability, for example, the Information field of the HE Capabilities element.

Alternatively, since element IDs are exhausted in IEEE 802.11, an extended information element format can be used where the element ID=255 and the Element ID Extension (one octet) field is added after the Length field. FIG. 8B shows a format example of the extended information element.

After the AP and the STA mutually grasp presence of the sleep function and WUR signal transmission function, the negotiation for registering the STA at the AP is performed through frame exchange. For example, one transmits the WUR setting request frame, and the other transmits the WUR setting response frame. This negotiation determines the WUR signal to be used (including a case of determining the format of the WUR signal), and the length of transmission duration for transmitting the WUR signal, if necessary. The WUR signal may be common within the BSS of the AR Alternatively, in a case where the AP can support multiple WUR signals, a configuration may be adopted that determines a required WUR signal among the WUR signals. For example, the WUR signal is changed on a STA-by-STA basis. Alternatively, in a case where application-specific groups are provided and the configuration of the AP is intended to be changed according to the WUR signal, the WUR signal may be determined according to the group to which the STA belongs. Alternatively, as described later, a terminal that can be activated as any one of an AP or a non-AP STA is intended to be activated as an AP or a non-AP STA, the WUR signal containing instruction information on an instruction for activation as an AP or a non-AP STA may be determined.

The case of the WUR signal common in the BSS is supplementarily described. For example, it is assumed that the MAC address of an activation target is included when the frame of WUR signal (WUR frame) is constructed. In this case, the MAC address of the AP is a BSSID. Consequently, the MAC address of the activation target is self-evidently common in this BSS. Even in a case where other information is added to the WUR frame, the other information is also common among STAs only if these STAs have negotiated for activating the AP among multiple (associated) STAs belonging to this BSS.

Negotiation example 1 uses an association process. That is, an association request frame transmitted by the STA is assumed as a WUR setting request frame, and an association response frame is assumed as a WUR setting response frame, and a negotiation is performed. Information required for the negotiation is stored as an information element, in any one or both of an association request frame and an association response frame. The notification on presence or absence of support to the sleep function and the WUR signal transmission function may be made through the same frame as that for the negotiation.

Negotiation example 2 defines a new management frame, and the negotiation is performed through exchange of this frame. For example, a WUR setting request frame and WUR setting response frame are newly defined. Typically, in IEEE 802.11 wireless LAN, a request frame is transmitted from a STA. However, in Example 2, the request frame may be transmitted from an AP. Transmission from the AP allows the AP to designate a STA intended to activate this AP. Besides the negotiation where the AP performs transmission to the STA on a one-to-one basis, the negotiation may be performed such that the AP transmits request frames to multiple STAs in DL-MU (Downlink-MultiUser), and response frames are collected from the STAs to the AP in UL-MU (Uplink-Multiuser). Examples of DL-MU include DL-OFDMA (Orthogonal Frequency Division Multiple Access), DL-MU-MIMO (Multi-User Multiple Input, Multiple Output), and a scheme of combination thereof. Examples of UL-MU include UL-OFDMA, UL-MU-MIMO, and a scheme of combination thereof.

FIG. 9A shows a sequence example in a case where the STA transmits the WUR setting request frame (B101) and the AP transmits the WUR setting response frame (B102). FIG. 9B shows a sequence example in a case where the AP transmits the WUR setting request frame (B111) and the STA transmits the WUR setting response frame (B112). Transmission of the acknowledgement response frame (ACK frame) is omitted from the figures.

The WUR signal is designated through the WUR setting request frame, for example. In the WUR setting response frame, the result of determination of whether the request by the WUR setting request frame is accepted or not is stored. The determination result is represented using a Status Code field, for example. A Status Code can be used commonly for an association response frame and also for a newly defined response management frame. For example, the Status Code field may be contained in the Information field of the information element. In a case where the designated WUR signal is accepted, the value of the Status Code field is 0, that is, SUCCESS. In a case where the designated WUR signal is not accepted, it is desired to include a Status Code representing the reason into the response management frame. For this usage, a new Status Code may be defined, for example. In a case where the receiver side does not accept the request through the WUR setting request frame, the receiver side can designate an alternative WUR signal through the WUR setting response frame. In such a scheme, the WUR signal designated by the transmitter side of the WUR setting response frame is conclusive. The signal set by the transmitter side of the WUR setting request frame is only for reference. It is desired that the Status Code have a value by which the transmitter side of the WUR setting request frame be capable of grasping that the alternative WUR signal is set in the WUR setting response frame.

The transmission duration length of the WUR signal and the WUR signal transmission rate (e.g., the OOK signal transmission rate) may be designated in a manner analogous to that of the determination of the WUR signal (MCS (a transmission rate) predefined in IEEE 802.11 standard may be used as the rate of the legacy preamble field). The WUR signal transmission rate may be designated according to a system (or a standard). In this case, the second PHY processor (activator) can be dedicated to wait for only the WUR signal in a specific transmission rate, which can achieve lower consumption. This is applicable not only to the case where the AP is activated but also to the case where the STA is activated as described later.

The mode where the AP sleeps and the STA activates the AP using the WUR signal has thus been described. Another mode may be adopted where, as the same with AP, the STA may include the activator (second PHY processor) and the power source controller, and the STA sleeps and the AP activates the STA using the WUR signal (after the AP is once activated, the mode may transition to this mode). In such a case, it is preferred that both DL (Downlink) and UL (Uplink) be allowed to be set as WUR application directions. The DL-WUR application direction corresponds to the case where the AP activates the STA. The UL-WUR application direction corresponds to the case where the STA activates the AP (the mode having thus been described). The negotiation in the case where both the directions can be set is hereinafter described in detail.

<Case of Linkage Between Frame Direction and DL/UL Setting (Applicable Only to Negotiation Example 2)>

For example, the WUR setting request frame is transmitted from the device that intends to be activated. That is, the direction opposite to the transmission direction of the WUR setting request frame is the WUR application direction. More specifically, in a case where the AP intends to cause the STA to activate the AP, the AP transmits the WUR setting request frame to the STA. The transmission direction of the WUR setting request frame is DL. The WUR application direction (the transmission direction of the WUR signal) is the UL direction from the STA to the AP. On the contrary, in a case where the STA intends to cause the AP to activate the STA, the STA transmits the WUR setting request frame to the AP. The transmission direction of the WUR setting request frame is UL. The WUR application direction (the transmission direction of the WUR signal) is the DL direction from the AP to the STA. The WUR setting response frame is transmitted in the direction opposite to that of the WUR setting request frame. Consequently, it can be represented that the direction of the WUR setting response frame and the WUR application direction are identical to each other.

<Case where DL/UL is Stored in WUR Setting Request Frame (Applicable to Both of Negotiation Examples 1 and 2)>

Figure 10A:
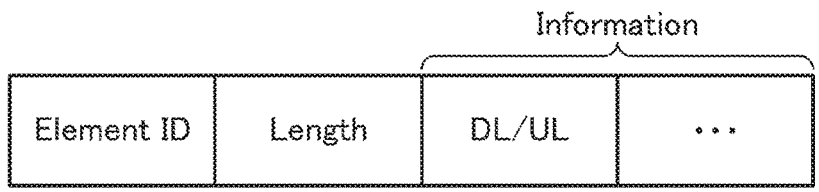
FIG. 10A is a diagram showing a format example of information elements.
Figure 10B:
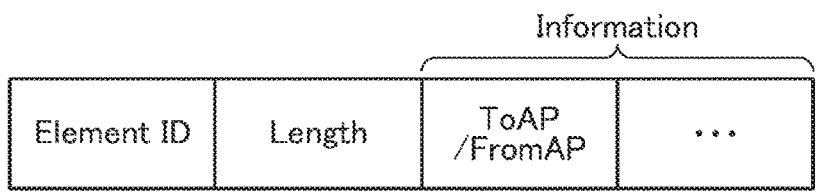
FIG. 10B is a diagram showing a format example of information elements.

For example, the WUR setting request frame may include a DL/UL field that indicates the WUR application direction. That is, as shown in FIG. 10A, an information element may be adopted that includes a DL/UL field in the Information field. Alternatively, a reserved field in the Information field in the existing information element may be used. In the case where the STA activates the AP, that is, the case where the WUR application direction is UL, a value indicating UL is set in the DL/UL field. In the case where the AP activates STA, that is, the case where the WUR application direction is DL, a value indicating DL is set in the DL/UL field. The DL/UL field may be one bit. For example, the case of 0 indicates DL, and the case of 1 indicates UL. Alternatively, an inverted definition may be made. Alternatively, for example, in the MAC frame supporting the existing IEEE 802.11 standard, representation analogous to that of ToDS/FromDS in Frame Control field in the MAC header may be used. This case is applicable also to a case where WUR is set between STA and STA (the case of direct link). For example, as shown in FIG. 10B, two-bit ToAP/FromAP field is newly defined. 10 indicates UL direction, 01 indicates DL direction, and 00 indicates the direction between STAs. 11 may be reserved. In the case where WUR can be set between the AP and another AP, 11 may be defined to indicate the direction between the APs. The two-bit setting example described here is one example. Another definition may be adopted.

In a case where the STA designates UL through the WUR setting request frame, it is preliminarily grasped that the AP supports the sleep function (reception of the WUR signal) through a beacon frame or a probe response frame sent from the AP, for example. The WUR setting request frame transmitted from the STA may be an association request frame or a new management request frame. The WUR setting response frame transmitted from the AP may be an association response frame, or a new response management frame corresponding to the new management request frame.

<Designation of Status Code and WUR Signal>

Figure 11A:
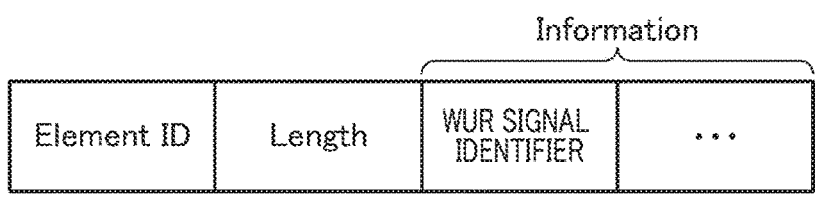
FIG. 11A is a diagram showing a format example of information elements.
Figure 11B:
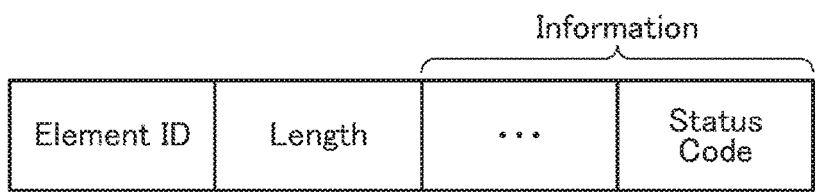
FIG. 11B is a diagram showing a format example of information elements.
Figure 11C:
FIG. 11C is a diagram showing a format example of information elements.

In the case of linkage between the WUR application direction and the frame direction, it can be considered that the transmitter side of the WUR setting request frame designates the WUR signal. For example, in the case where the WUR application direction is UL, the AP transmits the WUR setting request frame. The AP designates the WUR signal in the WUR setting request frame. The WUR signal may be designated by designating the identifier of the WUR signal. FIG. 11A shows an example of designating the identifier of the WUR signal through the information element. The identifier may be predetermined by a standard or a system, or may be determined by the AP and notified to the STAs belonging to the BSS. As described above, the designation of the identifiers of the WUR signals is applicable to the case where all the values of the WUR signals to be used are determined, the case where the format of the WUR signal is determined, and the case where the format and some values (e.g., the value of predetermined length) of the field are determined. The STA transmits the WUR setting response frame, and notifies whether to accept the request or not through the Status Code field. FIG. 11B shows an example of setting the Status Code field in the information element. In a case where the WUR signal designated by the AP is not accepted by the STA, the Status Code for notifying this fact is stored. Alternatively, the STA may notify an alternative WUR signal through the WUR setting response frame, and the AP may be allowed to use the signal. FIG. 11C shows an example of the information element in this case. It is desired that the Status Code field have a value by which the AP is allowed to grasp that the alternative WUR signal is set in the response frame. In the case where the WUR application direction is DL, it is only required to replace the AP and the STA with each other in the above description. Alternatively, the transmitter side of the WUR setting response frame (i.e., the transmitter side of the WUR signal) may designate the WUR signal through the WUR setting response frame. In this case, the transmitter side of the WUR setting request frame may use the WUR signal designated by the WUR setting response frame.

Here, it is discussed that the WUR setting is started by transmission of the WUR setting request frame always from the STA side.

For example, UL is considered as the WUR application direction. In a case where the WUR signal is also designated through the WUR setting request frame to be transmitted by the STA and the WUR signal designated by the STA cannot be accepted by the AP, the AP transmits the WUR setting response frame in which the Status Code field notifying this fact is stored therein. Alternatively, the AP may notify an alternative WUR signal through the WUR setting response frame, and the STA may be allowed to use the signal. In such a scheme, the WUR signal notified through the WUR setting response frame is conclusive. The signal notified through the WUR setting request frame is only for reference. It is desired that the Status Code have field a value by which the STA is allowed to grasp that the alternative WUR signal is set in the response frame.

In the case where the WUR application direction is DL, the WUR signal to be accepted by the STA is also designated through the WUR setting request frame to be transmitted by the STA. In a case where the AP does not accept the WUR signal designated by the STA, the AP may designate the WUR signal through the WUR setting response frame according to a scheme analogous to that in the case of UL described above. Note that, it is typically believed that the WUR signal receiver side has a limitation on WUR signal reception. Consequently, in the case of DL, the AP determines whether to accept the WUR signal designated by the STA unconditionally or not. If the signal is not accepted, the Status Code field for only notifying this fact may be transmitted.

In a case where UL is considered as the WUR application direction, a method may be adopted that does not designate the WUR signal through the WUR setting request frame transmitted by the STA but allows the AP to designate the signal through the WUR setting response frame. In this case, the STA may use the WUR signal designated by the AP through the WUR setting response frame as it is. In a case where DL is considered as the WUR application direction, the WUR signal receiver side has a limitation on reception as described above. Consequently, it is desired that the STA designates the WUR signal through the WUR setting request frame and the AP uses the WUR signal designated by the STA as it is.

<STAs with which the AP Negotiates for Activating this the AP are not Necessarily all the STAs in the BSS>

For example, in consideration of a scene for home use as shown in FIG. 2, STAs connected to the AP are PCs, a tablet, a smartphone, printers and the like. The situation where the AP is allowed to sleep is that where no user is present. It can be considered that the STAs whose communication is not performed and which allows determination that the user is absent are the smartphone and the tablet. Consequently, it is preferred that the AP negotiates only with the STAs having attributes of being carried by the user, as the STAs allowed to activate this AP. It may be configured such that a user selects the STAs for activating the AP, on an application operating on the AP or the STAs. As a result, the WUR setting request frame is transmitted from the AP to the selected STAs, for example. For example, this can be achieved by storing the MAC addresses of the selected STAs in a request primitive for activating the WUR setting request frame (the primitive is described later). The user may operate the AP or the STA so as to set the smartphone as the STA for activating the AP.

<Even after Disconnection of a Wireless Link with the STA, WUR-related Registration Information is Held>

Information registered in relation to WUR setting (WUR-related registration information) is required to be enabled even after disconnection of a wireless link between the STA and the AP (including the case of disconnection due to sleep). The WUR-related registration information is at least information pertaining to the STA having negotiated to activate the own AP, and information pertaining to the WUR signal with which the negotiation has been made (in a case where the negotiation has been made with transmission rate and transmission duration of the WUR signal, information on the rate and duration is also included). Furthermore, there is information for the AP to return to the state before sleep. It is required to secure spaces and the like for storing these pieces of information, to which reference can be made at the time of return. Thus, the AP can reuse information with which the negotiation has been made, without renegotiation after returning from sleep. Typically, normal information is made void at a stage after disconnection with the STA or determination of disconnection with the STA.

<Layer Configuration and Primitive>

Figure 12:
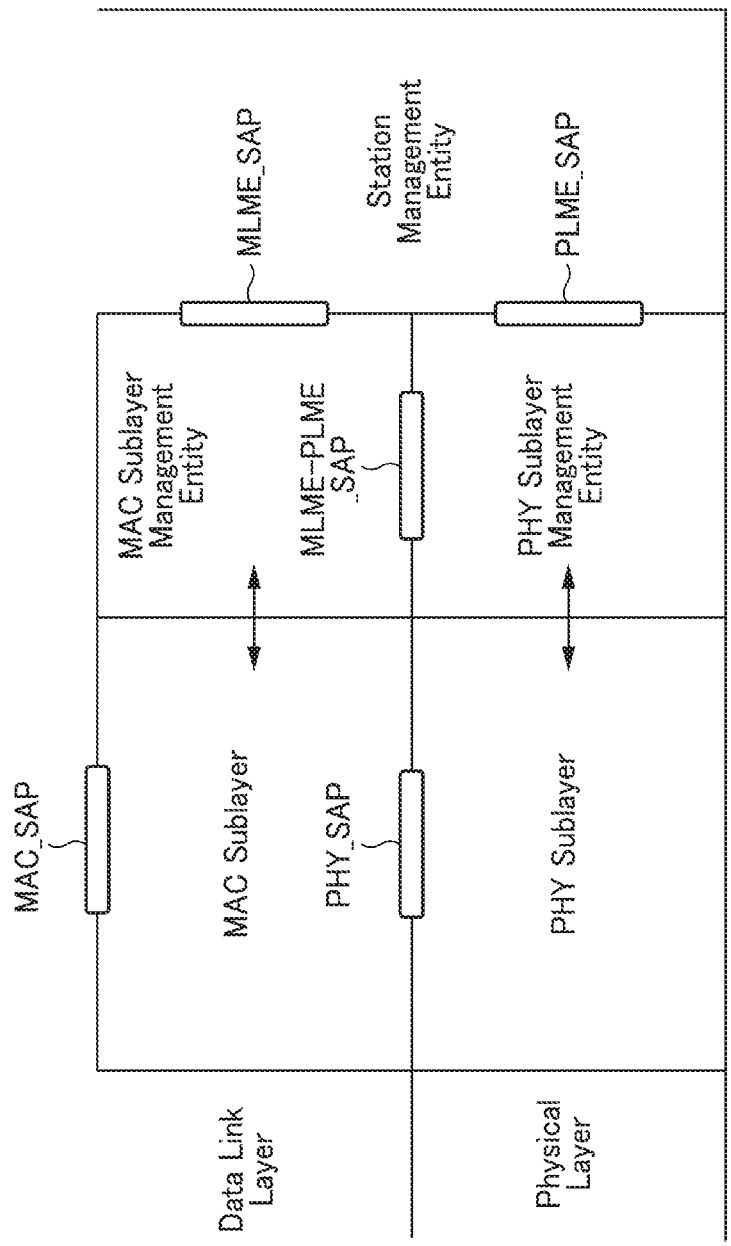
FIG. 12 is a diagram for illustrating a layer configuration of the terminal.

FIG. 12 shows an example of the layer configuration of a STA according to this embodiment. This layer configuration has been generally known. Below the MAC Sublayer, the PHY Sublayer is arranged. The PHY_SAP, which is an SAP (Service Access Point) for information exchange, is defined between these sublayers. Beside the MAC Sublayer, the MLME (MAC Sublayer Management Entity) for managing the MAC Sublayer is arranged. Beside the PHY Sublayer, the PLME (PHY Sublayer Management Entity) for managing the PHY Sublayer is arranged. That is, the MLME is a management entity for the MAC layer. The PLME is a management entity for the physical layer. The MLME-PLME_SAP is defined between these entities for information exchange. Beside both the MLME and the PLME, the SME (Station Management Entity) resides. The MLME_SAP is defined between the MLME and the SME for information exchange. The PLME_SAP is defined between the PLME and the SME for information exchange. The information exchange is performed through the primitives and parameter defined for each SAP. In the primitive, "request", "confirm", "indication" and "response" are defined. As described to some extent above, for example, MAC processor 11 of STA performs processes corresponding to those of the MAC Sublayer and the MLME. PHY processor 12 performs processes corresponding to those of the PHY Sublayer and the PLME. MAC/PHY manager 13 performs a process corresponding to that of the SME.

Figure 13:
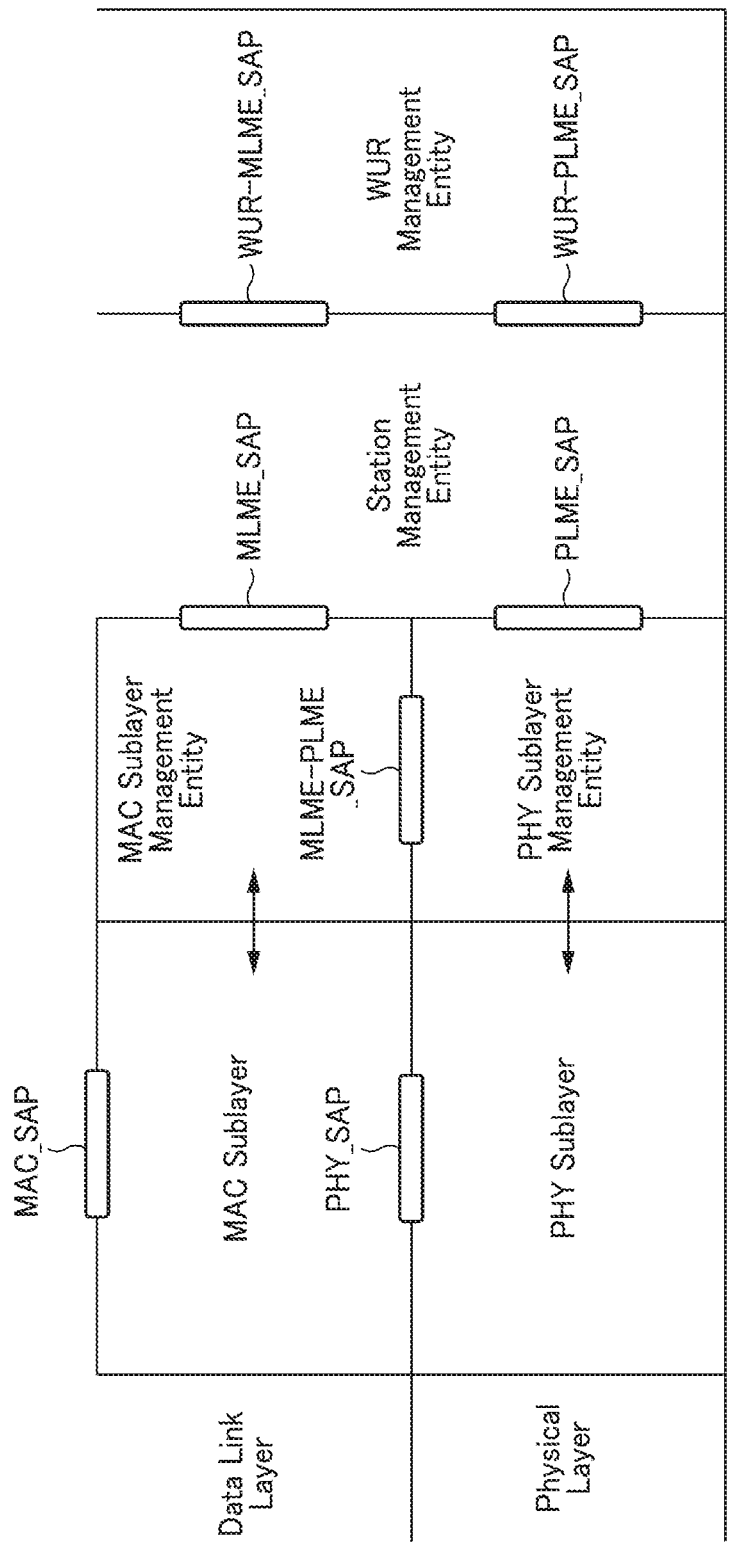
FIG. 13 is a diagram for illustrating a layer configuration of the access point.

FIG. 13 shows an example of the layer configuration of the AP according to this embodiment. The layer configuration is basically the same as the layer configuration of the STA. However, WUR Management Entity (represented as WUR_ME) newly defined in this embodiment is added beside the SME. The WUR-MLME_SAP and the WUR-PLME_SAP are defined for information exchange, between the WUR_ME and the SME. For example, second PHY processor 25 of the AP performs a process corresponding to that of the WUR_ME. MAC processor 21 performs processes corresponding to those of the MAC Sublayer and the MLME. First PHY processor 22 performs processes corresponding to those of the PHY Sublayer and the PLME. MAC/PHY manager 23 performs a process corresponding to that of the SME.

<MLME-SAP for Negotiation>

When exchanging new management frames for negotiation, an instruction signal (InterFace (I/F) signal) referring to the normal management request frame and response management frame exchange is exchanged between the MAC processor and the MAC/PHY manager. The I/F signal corresponds to the SAP (Service Access Point) primitive. For example, in a case of transmission of the WUR setting request frame from the STA as shown in FIG. 9A, a primitive (e.g., MLME-WUR-MANAGEMENT.request) newly defined for WUR in order to transmit the WUR setting request frame is issued by MAC/PHY manager 13, and is input into the MLME via the MLME_SAP. In this case, information required for the negotiation is set as parameter in the primitive. MLME generates the WUR setting request frame on the basis of the request primitive and the parameter, and transmits the frame via the MAC Sublayer. At the STA, upon arrival of the WUR setting response frame from the AP, the arrival is notified to the MLME via the MAC Sublayer, and the MLME inputs MLME-WUR-MANAGEMENT.confirm into the SME via the MLME_SAP. On the other hand, at the AP, upon receipt of the WUR setting request frame, the receipt is notified from the MAC Sublayer to the MLME, and the MLME inputs MLME-WUR-MANAGEMENT.indication into the SME via the MLME_SAP. The SME issues MLME-WUR-MANAGEMENT.response as a primitive for transmitting the WUR setting response frame, and inputs the response primitive to the MLME via the MLME_SAP. Information to be included in the WUR setting response frame as a response to the negotiation is set as parameters in the primitive. The MLME generates the WUR setting response frame on the basis of the response primitive and the parameter, and transmits the frame via the MAC Sublayer. The case of transmitting the WUR setting response frame from the STA has thus been described here. In the case of transmission from the AP, it is only required to read the description where the AP and the STA are replaced with each other.

Figure 14:
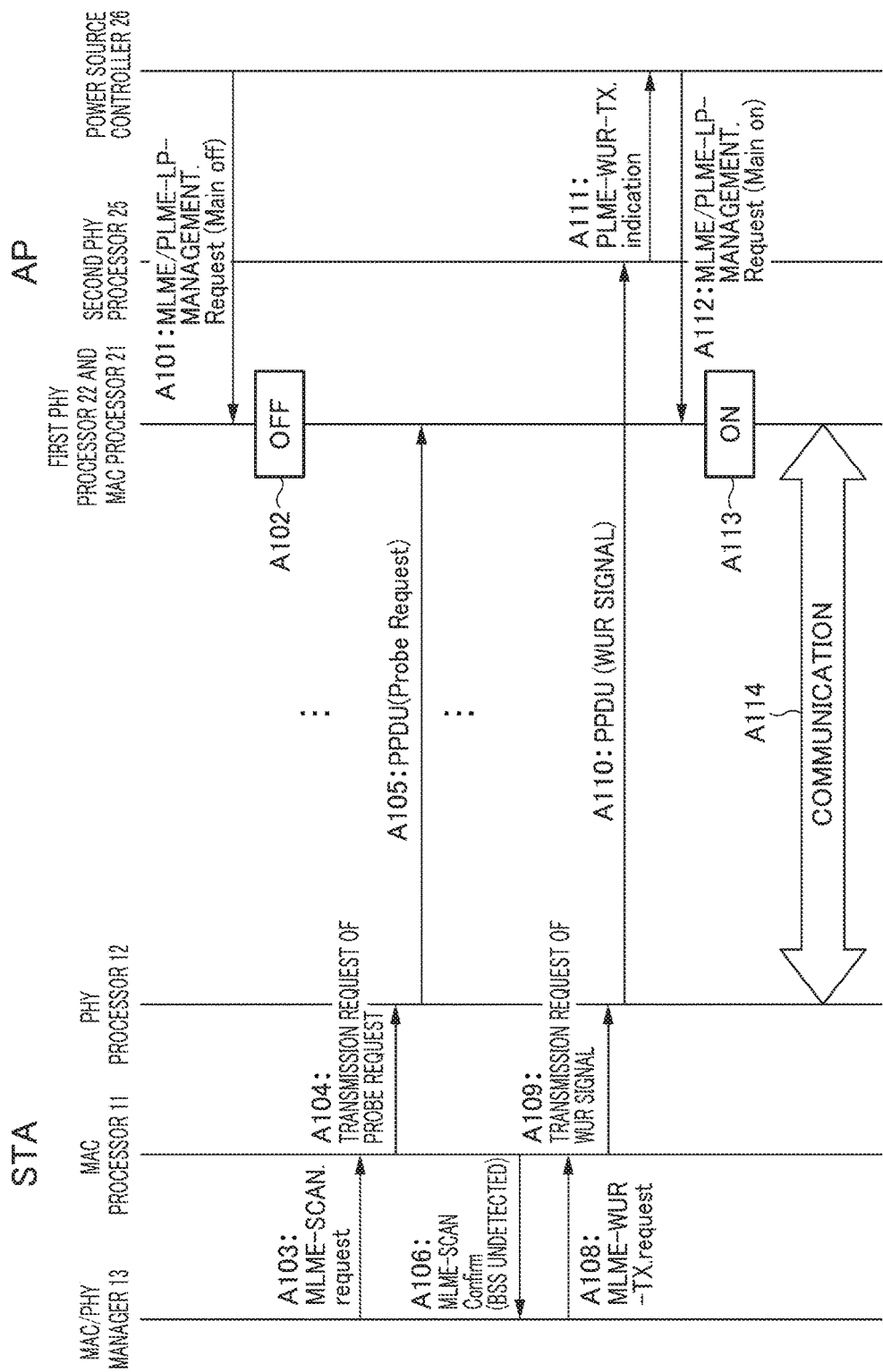
FIG. 14 is a diagram illustrating the communication sequence of FIG. 7 from another standpoint.

FIG. 14 is a diagram showing I/F signals between the units in the sequence of FIG. 7 described above by means of the primitives.

According to the conventional IEEE 802.11 standard, AP does not transition to the sleep state (transition to the power save mode). Consequently, this embodiment requires a new I/F signal (primitive) for WUR in order to cause the main radio unit of the AP to transition to sleep. In FIG. 14, MLME/PLME-LP-MANAGEMENT.request is defined as the primitive corresponding to the sleep instruction (A101) in FIG. 7. Conventionally, in IEEE 802.11 wireless LAN, the primitives are classified into MLME primitives for the MAC layer and PLME primitives for the PHY layer. Here, the main radio unit supports both the MAC layer and the PHY layer. Consequently, description is made such that "MLME/PLME- . . . ". For example, procedures may be adopted where a MLME primitive is input from the SME to the MLME through the MLME_SAP, an instruction is issued from the MLME to the PLME through MLME-PLME_SAP, and both the MAC layer and the PHY layer thus transition to sleep. In this case, the primitive from the SME may be the primitive only for the MLME, for example, MLME-LP-MANAGEMENT.request. Here, only the request primitive is described. However, a confirm primitive that forms a pair with the request primitive may be provided. The request and confirm primitives have a relationship analogous to that of typical primitives. When the request primitive is accepted at the management entity (MLME or PLME) that is the input target, the confirm primitive is returned. In an actual implementation, the primitive serves as a response signal on whether an input signal has been normally accepted or not. Alternatively, in an actual implementation, input may be made compulsory to negate the need of any acceptance response.

Conventionally, there has been a primitive for allowing the STA to transition to the power save mode. In the IEEE 802.11 wireless LAN standard, this primitive is MLME-POWERMANAGEMENT.request/confirm ("request" and "confirm" are comprehensively represented as "request/ confirm"). The parameters in the primitive on the request side include PowerManagementMode and ReceiveDTIMs. ACTIVE or POWER_SAVE can be selected as PowerManagementMode. In the case of ACTIVE, the state does not transit to sleep, and the awaking state is always maintained. In the case of POWER_SAVE, the state transitions to the power save mode in the conventional 802.11 wireless LAN standard where the state transits between the sleep and awaking states. RecieveDTIMs indicates whether the broadcast or multi-cast frame transmitted by the AP in DTIM cycle can be received, at every DTIM beacon by activation. However, this MLME-POWERMANAGEMENT.request/ confirm primitive cannot achieve the case of the AP in this embodiment, that is, the operation where the main radio unit is kept sleeping until the second PHY processor (activator) of the AP receives a specific WUR signal and activates the main radio unit of the AP. That is, the sleep mode of the AP according to this embodiment is a mode different from the power save mode of the STA in the conventional IEEE 802.11 wireless LAN. In this embodiment, the AP itself that originally broadcasts or transmits multi-cast frames in DTIM cycle transits to the sleep state, thereby negating the need of ReceiveDTIMs in the primitive for the sleep mode of the AP according to this embodiment.

Thus, a parameter for controlling the power source of the main radio unit is stored in MLME/PLME-LP-MANAGEMENT.request primitive (A101). For example, this parameter is MainRadioMode. The value is selectable between ON and OFF. In the case of ON, the state is a normal state where the main radio unit can transmit and receive packets (frames in view of the MAC layer level). In the case of OFF, the state is a state where the main radio unit cannot transmit and receive packets. Through this MainRadioMode parameter, transition to either of the states is instructed. According to the power source control for the main radio unit through the MainRadioMode parameter, the power control for second PHY processor (activator) 25 may be performed in a linked manner. For example, when an ON instruction is issued to the main radio unit, second PHY processor 25 may be turned OFF. When an OFF instruction is issued to the main radio unit, second PHY processor 25 is turned ON. Alternatively, the MainRadioMode parameter may be dedicated only to control the main radio unit.

The case where reception of the WUR signal by the STA from the AP activates the main radio unit is also different from that of the power save operation in the conventional IEEE 802.11 wireless LAN. Consequently, as with the above description, it is preferred that the primitive defined for WUR be used to cause the main radio unit to transit to sleep.

<WUR Signal Transmission at STA>

As the primitive corresponding to the scan request (A103) in FIG. 7, MLME-SCAN.request is input into the MLME from the SME through the MLME_SAP in order to execute scanning. When the MLME receives the MLME-SCAN.request, a primitive (e.g., PHY-TXSTART.request) analogous to that in the case of normal management frame transmission is input into PHY Sublayer from the MAC Sublayer through the PHY_SAP, for a probe request frame transmission. As described above, scan may be the passive scan that tries to receive a beacon frame, instead of the active scan that transmits a probe request frame.

As the primitive corresponding to the BSS-undetected report (A106) in FIG. 7, MLME-SCAN.confirm that represents the result of scan is input into the SME from the MLME through the MLME_SAP. Here, the parameter of "confirm" contains a result that indicates that the BSS has been undetected.

Newly defined MLME-WUR-TX.request/confirm is used as a primitive corresponding to the activation request (A108) in FIG. 7 that indicates an instruction for starting WUR signal transmission. For example, when a BSS intended to be connected with cannot be detected in MLME-SCAN-.confirm (A106) described above, the MLME-WUR-TX.request is input into the MLME from the SME through the MLME_SAP. The parameters required in the MLME-WUR-TX.request primitive include, for example, the WUR signal transmission duration length and information that designates the WUR signal to be transmitted (for example, in the case where multiple WUR signals reside and are selected to be used). In a case where a primitive for stopping the WUR signal transmission is defined and the WUR signal transmission is stopped using this primitive, the WUR signal transmission duration length is not required. It can be considered that the WUR signal to be transmitted is designated according to the index number, for example, as described above. Different index numbers may be assigned to the respective WUR signals in the information management base (MIB) to thereby allow the WUR signal to be identified. When the MLME receives the MLME-WUR-TX.request, a primitive (e.g., PHY-TXSTART.request) analogous to that in the case of normal management frame transmission is input into PHY Sublayer from the MAC Sublayer through the PHY_SAP.

Here, the WUR frame transmission instruction is issued from the SME through the MLME to the physical layer (see A108 and A109). Alternatively, the WUR frame transmission instruction may be issued directly to the physical layer. In this case, PLME-WUR-TX.request primitive may be input from the SME directly to the PLME.

As described above, upon receipt of a beacon frame from the AP, the STA may stop WUR signal transmission. In this case, the indication primitive for notifying that a beacon frame has been received from the target AP may be input from the MLME through the MLME_SAP into the SME, and the request primitive for an instruction of stopping the WUR signal transmission may be input anew from the SME into the MLME. Alternatively, the WUR signal transmission may be stopped on the MAC layer, and then the indication primitive about the stopping may be input into the SME.

On the other hand, second PHY processor (activator) 25 receives a specific WUR signal (the WUR signal determined through the negotiation), PLME-WUR-TX.indication primitive is input from the WUR_ME corresponding to second PHY processor 25 (WUR Management Entity in FIG. 13) through the WUR-PLME_SAP into the SME (corresponding to the activation request notification A111 in FIG. 7). This primitive is for notifying the WUR signal reception by second PHY processor 25. The PLME primitive is used here because it is assumed that second PHY processor 25 receives and decodes the packet for storing the WUR signal, extracts the WUR signal, and determines the WUR signal on the PHY layer. In a case where the payload is dealt with as the MAC frame and the WUR signal is extracted and determined on the MAC layer, the MLME primitive may be used instead of the PLME primitive. In this case, the MLME-WUR-TX.indication primitive may be input from the WUR_ME through the WUR-MLME SAP into the SME.

According to input of the PLME-WUR-TX.indication primitive or the MLME-WUR-TX.indication primitive into the SME, the SME determines that the WUR signal has been received. At this time, the SME activates the main radio unit using the MLME/PLME-LP-MANAGEMENT.request primitive (corresponding to the instruction to return from sleep in FIG. 7) described above. That is, the SME sets MainRadioMode parameter to ON, and inputs the parameter into the MLME/PLME-LP-MANAGEMENT.request primitive and the MLME/PLME. Thus, the main radio unit of the AP is reactivated.

Figure 15:
FIG. 15 is a flowchart of an operation of the terminal.

FIG. 15 is a flowchart showing an example of the operation of the STA according to this embodiment. In a case where the wireless LAN function is ON because the user carrying the STA has come home (for example, coming home may be determined by grasping the position information using GPS or the wireless LAN) or has turned on the power of the STA, the STA searches for the AP with which the negotiation has preliminarily been made (S101). For example, a probe request frame is transmitted. If a response (a probe response frame) is received from the AP (YES in S102), connection is made to this AP (S103), and normal communication is performed. On the contrary, if there is no response from the AP (NO) even after search (transmission of a probe request frame) in a certain period or a certain number of times, it is determined that there is a possibility that the AP is in the sleep state, and the packet (WUR packet) containing the control signal for activation (WUR signal) preset together with the AP is transmitted (S104). If the AP's activation is not confirmed even after transmission of the WUR signal for a certain period or a certain number of times (NO of S106), it is determined that the AP is not in the vicinity, and the trial is dropped. On the contrary, if the AP's activation is confirmed (YES of S105) by receipt of a predetermined signal, such as a beacon frame, from the AP, connection is made with the AP thereafter and normal communication is performed with the AP (S107). Even in the middle of the transmission duration of the WUR signal, the transmission of the WUR signal is stopped at the stage where the AP's activation is confirmed.

Figure 16B:
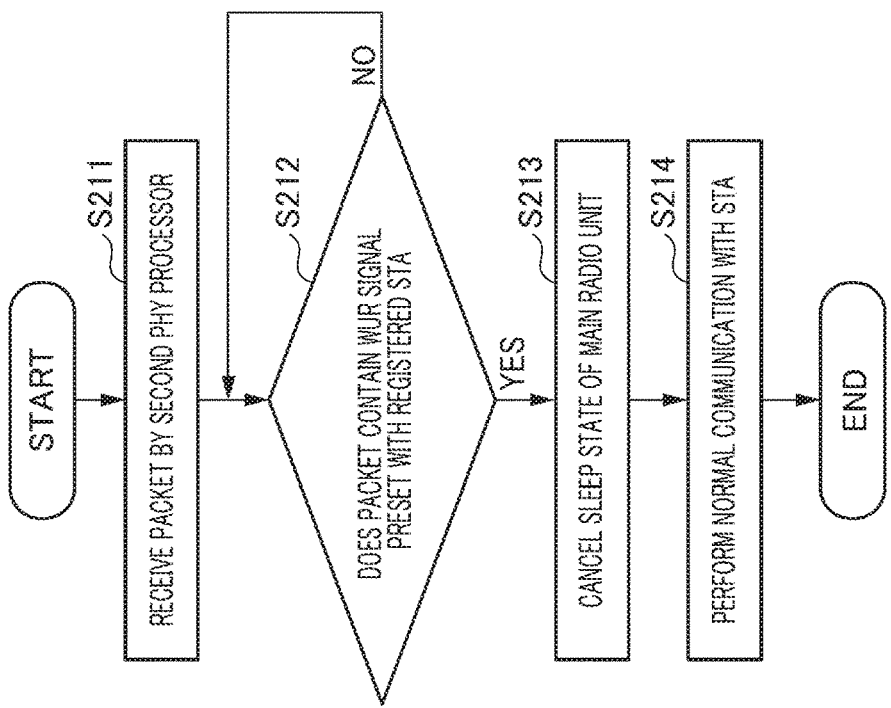
FIG. 16B is a flowchart of an operation of the access point.
Figure 16A:
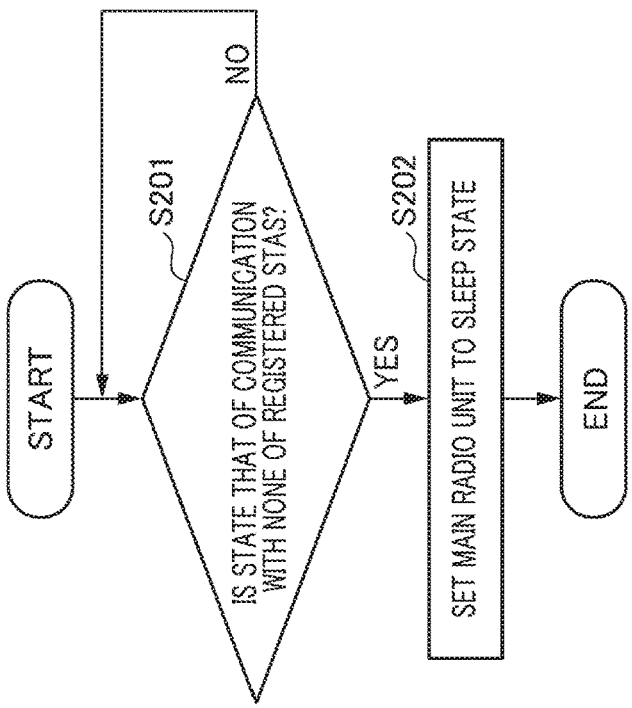
FIG. 16A is a flowchart of an operation of the access point.

FIGS. 16A and 16B are flowcharts showing examples of the operation of the AP according to this embodiment. Power source controller 26 of the AP determines whether communication is performed with none of the preregistered STAs (for example, whether all the users carrying the registered STAs are out) (S201). When the state is that none of the communication is done with the registered STAs (YES), the main radio unit (first PHY processor 22 and MAC processor 21) is set to the sleep state (S202). When the packet is received by second PHY processor 25 and contains the WUR signal preset with the preregistered STAs (S212), that is, when receipt of the WUR signal preset with the registered STAs is detected (YES), power source controller 26 cancels the sleep state of the main radio unit (S213). That is, the main radio unit is activated by supplying power to the main radio unit. Subsequently, normal communication is started with the registered STAs (S214).

As described above, according to this embodiment, the STA searches for the AP to be connected. When there is no response from the AP, it is determined that there is a possibility that the AP is in the sleep state, and then the WUR signal for activating the AP is transmitted. Consequently, sleep of the AP and the AP activation by the STA can be achieved without any request of specific action by the user. In the case of repetitive transmission of the WUR signal, predetermination of the transmission time length can limit STA's transmission of the WUR signal, thereby preventing useless signals from being continuously transmitted and allowing interference therearound to be reduced.

The AP can determine the sleep and cancellation of sleep (activation) of the main radio unit, without the user's special action. Consequently, in the case where the power to the main radio unit is stopped, transmission is not performed therearound, and no interference is given.

(Second Embodiment)

This embodiment allows the STA to activate the main radio unit temporarily (only in predetermined duration). In the first embodiment, the WUR-related registration information is enabled even after disconnection with the STA. This embodiment deals with exceptions thereof. Examples to achieve the exceptions are hereinafter described as Examples 1 to 3.

In Example 1, in the negotiation for registration, it is set, in the AP, whether the WUR function (WUR signal transmission function) of the STA is "temporary" or "permanent". In the "temporary" case, setting duration is provided in the negotiation, and after lapse of the setting duration, the AP removes WUR-related registration information. Any or both of the WUR setting request frame and the WUR setting response frame may contain information pertaining to the setting, and mutual agreement on the setting duration may be achieved. The specific method may be analogous to that of the case where the WUR signal and the transmission duration length of the WUR signal are determined.

In Example 2, not only procedures of negotiation for registration, but also procedures of negotiation for deleting registration may be defined and executed. That is, in a case where a predetermined condition is satisfied after completion of the negotiation for registration, the negotiation for deleting registration may be started by the STA or the AP. The deleting procedures may be defined in conformity with the negotiation for registration.

However, according to the methods of Examples 1 and 2, the STA after lapse of the setting duration or the STA after the registration has been deleted may reuse the same WUR signal as that in the negotiation, and there is a possibility the AP in sleep is activated by the WUR signal transmitted by the STA. The determination of whether the AP transitions to sleep is not affected by the presence or absence of the STA after lapse of the setting duration, or presence or absence of the STA whose registration has been deleted.

In Example 3, the WUR signal for the AP's activation is common in the BSS while procedures capable of changing the WUR signal are provided. For example, through any or both of a beacon frame and a probe response frame, the identifier (index number, etc.) of the WUR signal is transmitted. In this case, IEEE 802.11w standard is used, and transmission is made through an encrypted management frame. The encrypted management frame may be according to a mode of unicast transmission to each STA caused to activate the AP, or a mode of multi-cast transmission to multiple STAs caused to activate the AP. If the encryption of the broadcast frame may be changed and the STAs connected to the AP can grasp the change, broadcast transmission may be adopted.

(Third Embodiment)

In this embodiment, the WUR-related registration information set by the STA through the negotiation with the AP is allowed to be used by another AP connected through a DS (Distribution System). That is, when the STA moves from the BSS of movement-source the AP to a BSS of another AP, the same WUR-related registration information is allowed to be used also in the movement-destination AP. A wireless LAN that includes such APs constitutes an ESS (Extended Service Set).

For example, the AP to which the STA has moved can cause the main radio unit to sleep and then activate the main radio unit by receiving the WUR signal, as the same with the movement-source AP. In this case, the STA uses the WUR signal identical to that used in the movement-source AP, as the WUR signal for activating the main radio unit of AP to which the STA has moved.

This is also applicable to a case of a configuration where it is assumed that the moving STA itself can cause the main radio unit to sleep and then activate the main radio unit of the own device by receiving the WUR signal, the sleeping STA is activated from the AP to which the STA has moved. For example, the movement-destination AP can activate the main radio unit of the STA using the same WUR signal as that used in the movement-source AP.

To achieve these capabilities, for example, information pertaining to the WUR signal may be included in a frame to be exchanged for a Fast BSS Transition (FT) function that achieves high-speed roaming. It can be considered that the frame in which the information is stored and which is to be exchanged for the FT function may be an authentication frame or FT Action frame. The frames are transmitted to the movement-source AP.

In consideration of change in frequency band, information on the WUR signal may be included in the frame to be exchanged for Fast Session Transfer (FST) function for switching the operation frequency band at high speed, in an analogous manner. FST Setup Request frame can be considered as the frame in which the information is to be input and which is to be exchanged for the FST function.

For example, it is configured such that the information element used for the negotiation between the AP and the STA described above can be stored in these frames, and, in frame exchange for FT or FST, information on the negotiation result (for example, the index number of the WUR signal, the transmission duration length of the WUR signal, etc.) can be stored.

(Fourth Embodiment)

This embodiment discusses a use case of tethering of PC using a smartphone. In this case, the smartphone serves as AP, while PC serves as STA. A case is typically assumed where the user turns OFF the wireless LAN function of the smartphone. In this case, it is bothering for the user to take out the smartphone intentionally and turns on tethering (also turning ON the wireless LAN at this stage). It is thus desirable that PC be allowed to turn ON the wireless LAN function of the smartphone having been registered (hereinafter, the registered smartphone) and to turn ON tethering automatically.

Figure 17:
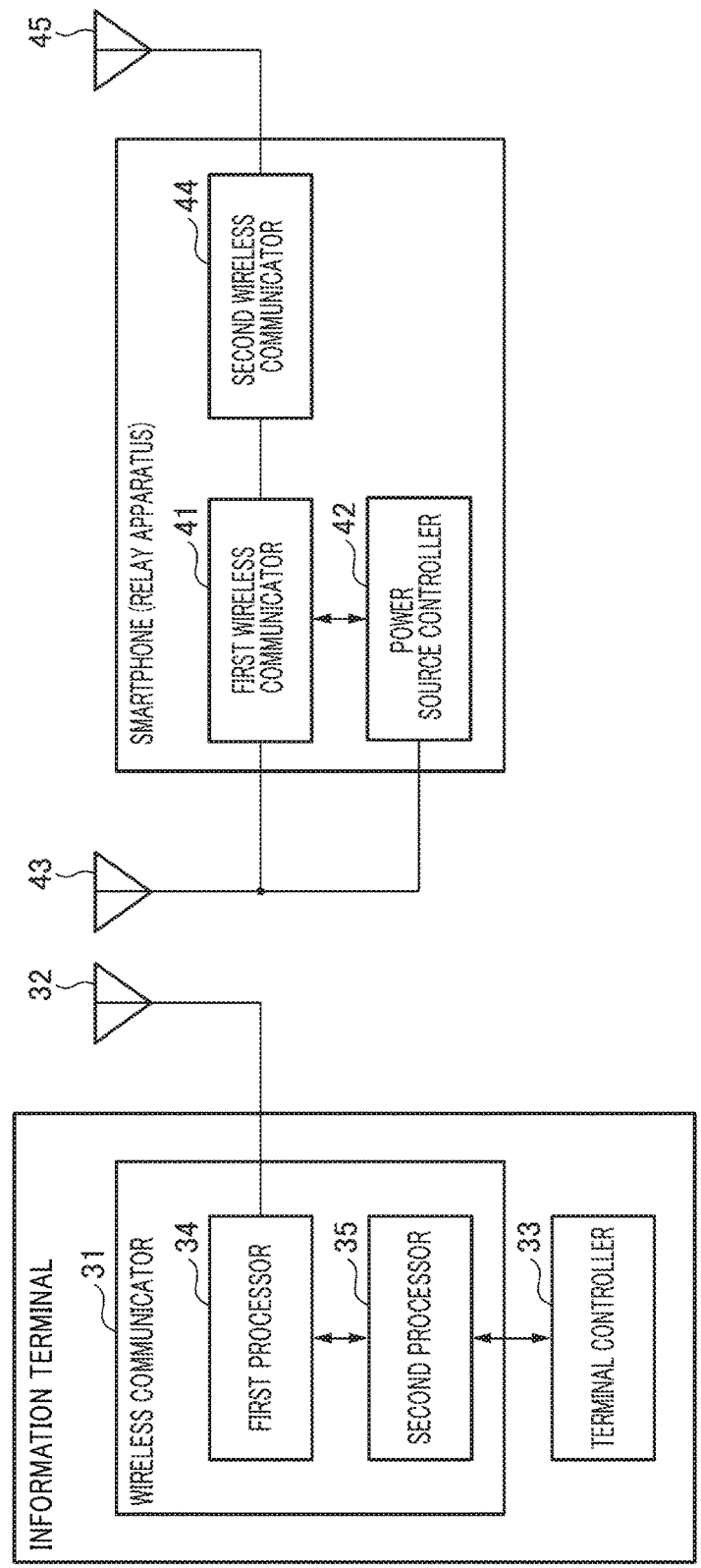
FIG. 17 is a system configuration diagram according to a fourth embodiment.

FIG. 17 shows a system configuration diagram according to this embodiment. An information terminal, such as PC or a tablet, and a smartphone that serves as a relay apparatus during tethering are shown. The information terminal (PC is assumed here) includes configuration elements (wireless communicator 31 and antenna 32) analogous to those of the STA shown in FIG. 3, and a terminal controller 33. Wireless communicator 31 is, for example, a wireless LAN module, and includes first processor 34, and second processor 35. First processor 34 corresponds to MAC processor 11 and PHY processor 12 shown in FIG. 3. Second processor 35 corresponds to MAC/PHY manager 13. Terminal controller 33 performs processes higher than those on the MAC layer, such as on drivers and applications, for example. The processes on TCP/IP and the like may be performed by terminal controller 33. Wireless communicator 31 has the layer configuration in FIG. 12, for example.

The smartphone includes configuration elements (first wireless communicator 41, power source controller 42, and antenna 43) analogous to those shown in FIG. 4, and second wireless communicator 44 and antenna 45 that perform cellular communication. For example, first wireless communicator 41 corresponds to MAC processor 21, first PHY processor 22, and MAC/PHY manager 23 from which power source controller 26 is omitted; these elements are shown in FIG. 4. Power source controller 42 corresponds to both of power source controller 26 included in MAC/PHY manager 23, and second PHY processor 25. The sections of MAC/PHY manager 23 from which power source controller 26 is omitted may correspond to power source controller 42 instead of first wireless communicator 41. Second wireless communicator 44 uses antenna 45 to perform the fourth generation mobile telecommunication and the next generation mobile telecommunication. First wireless communicator 41 and second wireless communicator 44 are connected to each other. Data received through cellular communication can be passed to first wireless communicator 41, and data received through wireless LAN communication can be passed to second wireless communicator 44. First wireless communicator 41 and power source controller 42 have layer configurations in FIG. 13, for example.

In tethering, PC (information terminal) uses the smartphone as a relay apparatus. Here, an example of PC as the information terminal is assumed. Alternatively, another apparatus, such as a tablet, may be adopted.

PC transmits the WUR signal to the smartphone registered in this PC through a preliminary negotiation, in order to activate the wireless LAN (including turning ON tethering) of the smartphone. For example, this can be achieved by MLME-WUR-TX.request (see A108 in FIG. 14) described above. This is a mode where this MLME-WUR-TX.request primitive is activated by an application on the PC. There may be MLME-WUR-TX.confirm that forms a pair with MLME-WUR-TX.request. To allow the smartphone to play a role as the AP, after the smartphone is activated (awakes) as STA, the smartphone may serve as Group Owner of Wi-Fi Direct by normal setting with the PC. In Wi-Fi Direct, the STAs can communicate with each other without intervention by the AP. In this case, one of STAs connected to each other by Wi-Fi Direct serves as AP (i.e., a simple AP-like role in Wi-Fi Direct). The STA that plays the role of the AP is the group owner.

On the other hand, it may be configured such that the smartphone sleeping as the STA is not activated as the STA but is activated as AP with the wireless LAN function being turned ON and tethering being turned ON. For the sake of discriminating this use case from the normal use case (DL-WUR control where the smartphone serves as STA and is activated by AP through the WUR signal), a WUR signal for tethering is defined. In this case, when the smartphone is also activated as STA by a normal AP, the smartphone is required to be capable of identifying multiple WUR signals. That is, the WUR signal used for activation as STA and the WUR signal for tethering are required to be discriminable from each other. The smartphone having received the WUR signal for tethering turns ON the wireless LAN function and turns ON tethering, and is activated as AP. Activation as AP allows the smartphone to function as the relay apparatus of tethering. PC may also be allowed to discriminate the WUR signal for tethering and the normal WUR signal from each other (for example, in a case where PC is also to be activated by the AP through the WUR signal).

For example, the WUR signal for tethering may be preliminarily set, exchanged and shared between PC and the smartphone in the Wi-Fi Direct negotiation, and be held in both the parties.

According to another method, PC may serve as AP, and PC may activate the smartphone as STA first and then replace the AP/STA roles through frame exchange on the wireless LAN. That is, PC is changed from AP to STA, while the smartphone being changed from the STA to the AP. To replace the AP/STA roles with each other, for example, new frames, such as a tethering request frame and a tethering response frame, may be defined, and these frames may be exchanged. In this case, a new SAP for exchanging the new frames is required to be defined. For example, indication primitive for triggering activation of MLME-START.request for starting allowing the own smartphone to operate as AP is predefined on the smartphone side. For example, upon receipt of the tethering request frame from the PC, the smartphone inputs the indication primitive into SME via MLME_SAP. SME inputs MLME-START.request into MLME. Accordingly, the role of the smartphone is changed from the STA to the AP. Likewise, PC changes the role to that of the STA. For example, in response to receipt of the tethering response frame, the newly defined indication primitive is input into SME, and SME inputs, into MLME, a request for starting operation as STA. The transmission of the tethering response frame from the smartphone may be made before or after the role of the smartphone is changed.

As to still another method, without definition of the new frames for replacing the AP/STA roles with each other, normal Wi-Fi Direct connection procedures may be executed at the stage where communication is allowed between the smartphone and PC. Thus, the smartphone can also serve as Group Owner (i.e., STA having a simple AP-like role in Wi-Fi Direct).

(Fifth Embodiment)

This embodiment describes an example of activating a printer from an information terminal, such as a smartphone, a tablet or PC. For example, a use case can be considered where the smartphone or the like directly outputs data to the printer without intervention of an AP. The fourth embodiment described above can be achieved even if the AP does not reside except the smartphone and PC. Likewise, this embodiment can be achieved even if the AP does not reside except the smartphone and printer. Furthermore, this embodiment can be achieved in a case where the AP resides and the smartphone and the printer are in the area of the AP.

Figure 18:
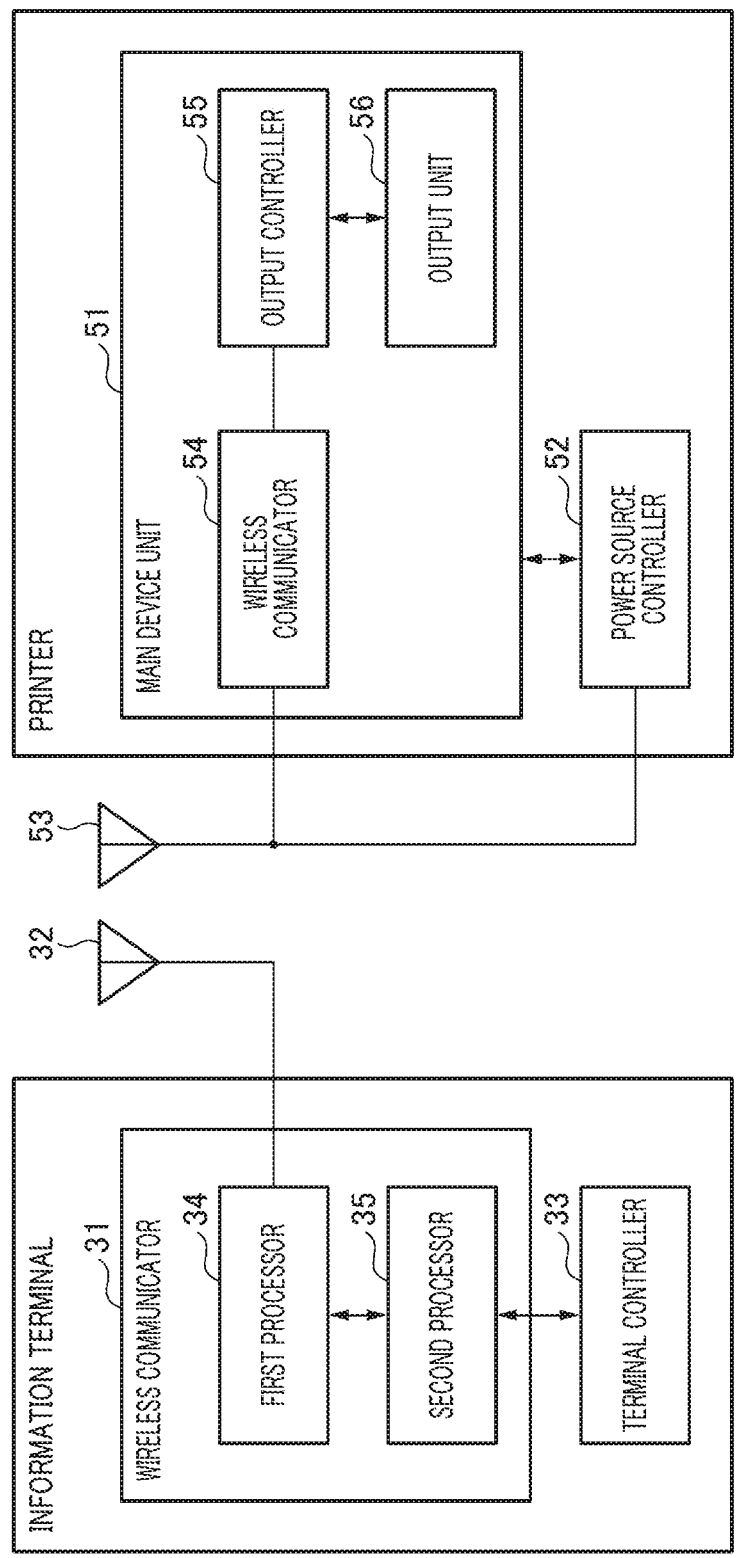
FIG. 18 is a system configuration diagram according to a fifth embodiment.

FIG. 18 shows a system configuration diagram according to this embodiment. This diagram shows an information terminal, and a printer. The information terminal may be, for example, a smartphone, tablet, PC or the like. A smartphone is hereinafter assumed. The configuration of the information terminal is analogous to that of the information terminal shown in FIG. 17. Consequently, the description thereof is omitted.

The printer includes main device unit 51, power source controller 52, and antenna 53. Main device unit 51 includes wireless communicator 54, output controller 55, and output unit 56. For example, wireless communicator 54 corresponds to MAC processor 21, first PHY processor 22, and sections of MAC/PHY manager 23 from which the power source controller is omitted; these elements are shown in FIG. 4. Power source controller 52 corresponds to power source controller 26 included in MAC/PHY manager 23, and second PHY processor 25. The sections of MAC/PHY manager 23 from which power source controller 26 is omitted may correspond to power source controller 52 instead of wireless communicator 54. Output controller 55 includes a CPU, memory of the printer and the like, and controls the overall operation of the printer. Output unit 56 performs printing on the basis of data for printing passed from output controller 55. Output controller 55 is connected to wireless communicator 54, and receives, through wireless communicator 54, the data having received from the information terminal in wireless LAN communication, and performs printing using output unit 56. Wireless communicator 54 and power source controller 52 have layer configurations in FIG. 13, for example.

In a case where data is transmitted from the smartphone directly to the printer (without intervention of the original AP), the printer serves as AP. In this case, to make the printer printable only by an operation on the smartphone without any operation on the printer, it is required to turns ON the wireless LAN function of the printer through the smartphone and to cause the printer to operate in an AP mode.

To activate the wireless LAN of the printer from the smartphone, WUR signal transmission to the printer is started. For example, this can be achieved by MLME-WUR-TX.request (see A108 in FIG. 14) described above. This is a mode where this MLME-WUR-TX.request primitive is activated by an application on the smartphone. There may be MLME-WUR-TX.confirm that forms a pair with MLME-WUR-TX.request. To allow the printer to function as AP, after the printer is activated (awakes) as STA, the printer may serve as Group Owner of Wi-Fi Direct by normal setting with the smartphone.

Alternatively, a printer caused to sleep as STA may activate the wireless LAN function of the printer, and be temporarily activated as AP between the printer and a smartphone. For the sake of discriminating this use case from a normal use case (DL-WUR control where the printer is activated as STA under the AP by this AP through the WUR signal), a dedicated WUR signal is required to be defined. In this case, the smartphone is required to be capable of identifying the dedicated WUR signal for activating the printer as AP. Furthermore, because the WUR signal (normal WUR signal) for activating the printer as STA is also required to be set in the printer, the normal WUR signal and the dedicated WUR signal are required to be discriminated from each other.

For example, the dedicated WUR signal may be preliminarily set, exchanged and shared between the smartphone or the like and the printer in the Wi-Fi Direct negotiation, and be held in both the parties.

Alternatively, the smartphone may serve as AP, and this smartphone may activate the printer as STA first and then replace the AP/STA roles through frame exchange on the wireless LAN. To replace the AP/STA roles with each other, for example, new frames, such as a direct print request frame and a direct print response frame, may be defined, and these frames may be exchanged. In this case, a new SAP for exchanging the new frames is required to be defined. For example, indication primitive for triggering activation of MLME-START.request for starting allowing the printer to operate as AP is predefined on the printer side. For example, upon receipt of the direct print request frame from the smartphone, the printer inputs the indication primitive into SME via MLME_SAP. SME inputs MLME-START.request into MLME. Accordingly, the role of the printer is changed from the STA to the AP. It is thus defined.

Alternatively, without definition of the new frames for replacing the AP/STA roles with each other, normal Wi-Fi Direct connection procedures may be executed at the stage where communication is allowed between the printer and the smartphone. Thus, the printer can serve as Group Owner (i.e., STA having a simple AP-like role in Wi-Fi Direct).

Transition of the printer to the sleep state is analogous to that of the AP in the first embodiment. That is, when there is no frame exchange between the printer and the smartphone, power supply to the main radio unit of the printer is stopped or suppressed.

(Sixth Embodiment)

Figure 19:
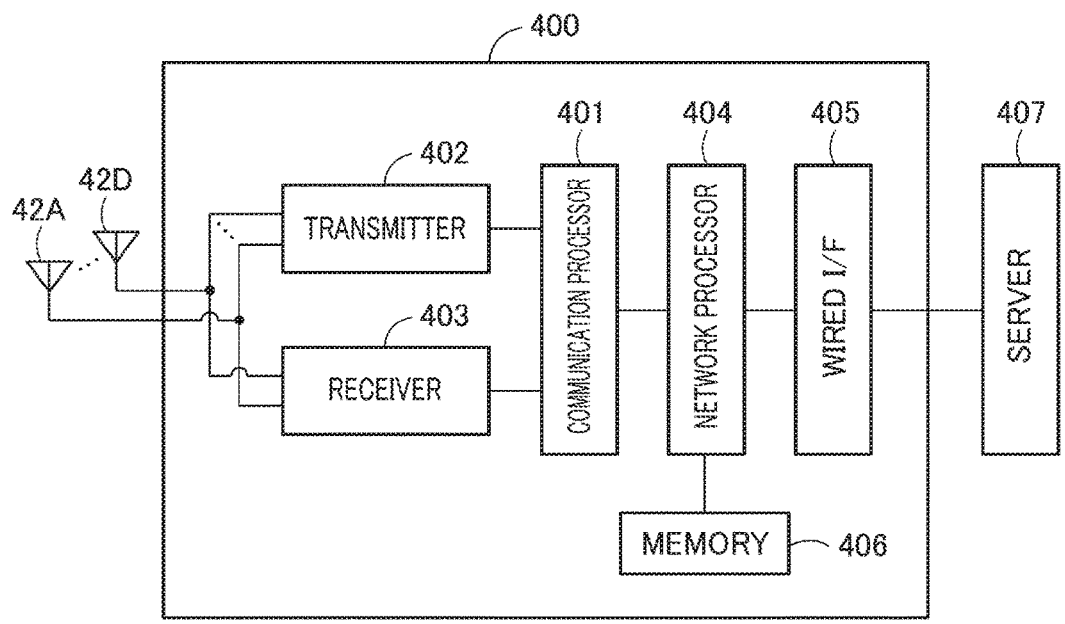
FIG. 19 is a functional block diagram of the terminal or the access point.

FIG. 19 is a functional block diagram of a base station (access point) 400 according to the embodiment. The access point includes a communication processor 401, a transmitter 402, a receiver 403, antennas 42A, 42B, 42C, and 42D, a network processor 404, a wired I/F 405, and a memory 406. The access point 400 is connected to a server 407 through the wired I/F 405. At least a former of the communication processor 401 and the network processor 404 has functions similar to the controller in the first embodiment. The transmitter 402 and the receiver 403 have functions similar to the transmitter and the receiver described in the first embodiment. Alternatively, the transmitter 402 and the receiver 403 may perform analog domain processing in the transmitter and the receiver and the network processor 404 may perform digital domain processing in the transmitter and the receiver in the first embodiment. The communication processor 404 has functions similar to the upper layer processor. The communication processor 401 may internally possess a buffer for transferring data to and from the network processor 404. The buffer may be a volatile memory, such as an SRAM or a DRAM, or may be a non-volatile memory, such as a NAND or an MRAM.

The network processor 404 controls data exchange with the communication processor 401, data writing and reading to and from the memory 406, and communication with the server 407 through the wired I/F 405. The network processor 404 may execute a higher communication process of the MAC layer, such as TCP/IP or UDP/IP, or a process of the application layer. The operation of the network processor may be performed through processing of software (program) by a processor, such as a CPU. The operation may be performed by hardware or may be performed by both of the software and the hardware.

For example, the communication processor 401 corresponds to a baseband integrated circuit, and the transmitter 402 and the receiver 403 correspond to an RF integrated circuit that transmits and receives frames. The communication processor 401 and the network processor 404 may be formed by one integrated circuit (one chip). Parts that execute processing of digital areas of the transmitter 402 and the receiver 403 and parts that execute processing of analog areas may be formed by different chips. The communication processor 401 may execute a higher communication process of the MAC layer, such as TCP/IP or UDP/IP. Although the number of antennas is four here, it is only necessary that at least one antenna is included.

The memory 406 saves data received from the server 407 and data received by the receiver 402. The memory 406 may be, for example, a volatile memory, such as a DRAM, or may be a non-volatile memory, such as a NAND or an MRAM. The memory 406 may be an SSD, an HDD, an SD card, an eMMC, or the like. The memory 406 may be provided outside of the base station 400.

The wired I/F 405 transmits and receives data to and from the server 407. Although the communication with the server 407 is performed through a wire in the present embodiment, the communication with the server 407 may be performed wirelessly.

The server 407 is a communication device that returns a response including requested data in response to reception of a data forward request for requesting transmission of the data. Examples of the server 407 include an HTTP server (Web server) and an FTP server. However, the server 407 is not limited to these as long as the server 407 has a function of returning the requested data. The server 407 may be a communication device operated by the user, such as a PC or a smartphone. The server 407 may wirelessly communicate with the base station 400.

When the STA belonging to the BSS of the base station 400 issues a forward request of data for the server 407, a packet regarding the data forward request is transmitted to the base station 400. The base station 400 receives the packet through the antennas 42A to 42D. The base station 400 causes the receiver 403 to execute the process of the physical layer and the like and causes the communication processor 401 to execute the process of the MAC layer and the like.

The network processor 404 analyzes the packet received from the communication processor 401. Specifically, the network processor 404 checks the destination IP address, the destination port number, and the like. When the data of the packet is a data forward request such as an HTTP GET request, the network processor 404 checks whether the data requested by the data forward request (for example, data in the URL requested by the HTTP GET request) is cached (stored) in the memory 406. A table associating the URL (or reduced expression of the URL, such as a hash value or an identifier substituting the URL) and the data is stored in the memory 406. The fact that the data is cached in the memory 406 will be expressed that the cache data exists in the memory 406.

When the cache data does not exist in the memory 406, the network processor 404 transmits the data forward request to the server 407 through the wired I/F 405. In other words, the network processor 404 substitutes the STA to transmit the data forward request to the server 407. Specifically, the network processor 404 generates an HTTP request and executes protocol processing, such as adding the TCP/IP header, to transfer the packet to the wired I/F 405. The wired I/F 405 transmits the received packet to the server 407.

The wired I/F 405 receives, from the server 407, a packet that is a response to the data forward request. From the IP header of the packet received through the wired I/F 405, the network processor 404 figures out that the packet is addressed to the STA and transfers the packet to the communication processor 401. The communication processor 401 executes processing of the MAC layer and the like for the packet. The transmitter 402 executes processing of the physical layer and the like and transmits the packet addressed to the STA from the antennas 42A to 42D. The network processor 404 associates the data received from the server 407 with the URL (or reduced expression of the URL) and saves the cache data in the memory 406.

When the cache data exists in the memory 406, the network processor 404 reads the data requested by the data forward request from the memory 406 and transmits the data to the communication processor 401. Specifically, the network processor 404 adds the HTTP header or the like to the data read from the memory 406 and executes protocol processing, such as adding the TCP/IP header, to transmit the packet to the communication processor 401. In this case, the transmitter IP address of the packet is set to the same IP address as the server, and the transmitter port number is also set to the same port number as the server (destination port number of the packet transmitted by the communication terminal), for example. Therefore, it can be viewed from the STA as if communication with the server 407 is established. The communication processor 401 executes processing of the MAC layer and the like for the packet. The transmitter 402 executes processing of the physical layer and the like and transmits the packet addressed to the STA from the antennas 42A to 42D.

According to the operation, frequently accessed data is responded based on the cache data saved in the memory 406, and the traffic between the server 407 and the base station 400 can be reduced. Note that the operation of the network processor 404 is not limited to the operation of the present embodiment. There is no problem in performing other operation when a general caching proxy is used, in which data is acquired from the server 407 in place of the STA, the data is cached in the memory 406, and a response is made from the cache data of the memory 406 for a data forward request of the same data.

The base station (access point) according to the present invention can be applied for the base station in the above-stated any embodiment. The transmission of the frame, the data or the packet used in the any embodiment may be carried out based on the cached data stored in the memory 406. Also, information obtained based on the frame, the data or the packet received by the base station in the first to seventh embodiments may be cached in the memory 406. The frame transmitted by the base station in the first to seventh embodiments may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal, The base station (access point) according to the present invention can be applied for the base station in the above-stated any embodiment. In the present embodiment, although the base station with the cache function is described, a terminal (STA) with the cache function can also be realized by the same block configuration as FIG. 19. In this case, the wired I/F 405 may be omitted. The transmission, by the terminal, of the frame, the data or the packet used in the any embodiment may be carried out based on the cached data stored in the memory 406. Also, information obtained based on the frame, the data or the packet received by the terminal in the any embodiment may be cached in the memory 406. The frame transmitted by the terminal in the first embodiment may include the cached data or information based on the cached data. The information based on the cached data may include information on a size of the data, a size of a packet required for transmission of the data. The information based on the cached data may include a modulation scheme required for transmission of the data. The information based on the cached data may include information on existence or non-existence of data addressed to the terminal.

(Seventh Embodiment)

Figure 20:
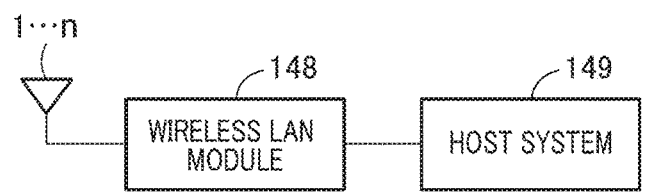
FIG. 20 is a functional block diagram of the access point or the terminal.

FIG. 20 shows an example of entire configuration of a terminal (WLAN terminal) or a base station. The example of configuration is just an example, and the present embodiment is not limited to this. The terminal or the base station includes one or a plurality of antennas 1 to n (n is an integer equal to or greater than 1), a wireless LAN module 148, and a host system 149. The wireless LAN module 148 corresponds to the wireless communication device according to any of the embodiments. The wireless LAN module 148 includes a host interface and is connected to the host system 149 through the host interface. Other than the connection to the host system 149 through the connection cable, the wireless LAN module 148 may be directly connected to the host system 149. The wireless LAN module 148 can be mounted on a substrate by soldering or the like and can be connected to the host system 149 through wiring of the substrate. The host system 149 uses the wireless LAN module 148 and the antennas 1 to n to communicate with external apparatuses according to an arbitrary communication protocol. The communication protocol may include the TCP/IP and a protocol of a layer higher than that. Alternatively, the TCP/IP may be mounted on the wireless LAN module 148, and the host system 149 may execute only a protocol in a layer higher than that. In this case, the configuration of the host system 149 can be simplified. Examples of the present terminal include a mobile terminal, a TV, a digital camera, a wearable device, a tablet, a smartphone, a game device, a network storage device, a monitor, a digital audio player, a Web camera, a video camera, a projector, a navigation system, an external adaptor, an internal adaptor, a set top box, a gateway, a printer server, a mobile access point, a router, an enterprise/service provider access point, a portable device, a hand-held device, a vehicle and so on.

The wireless LAN module 148 (or the wireless communication device) may have functions of other wireless communication standards such as LTE (Long Term Evolution), LTE-Advanced (standards for mobile phones) as well as the IEEE802.11.

Figure 21:
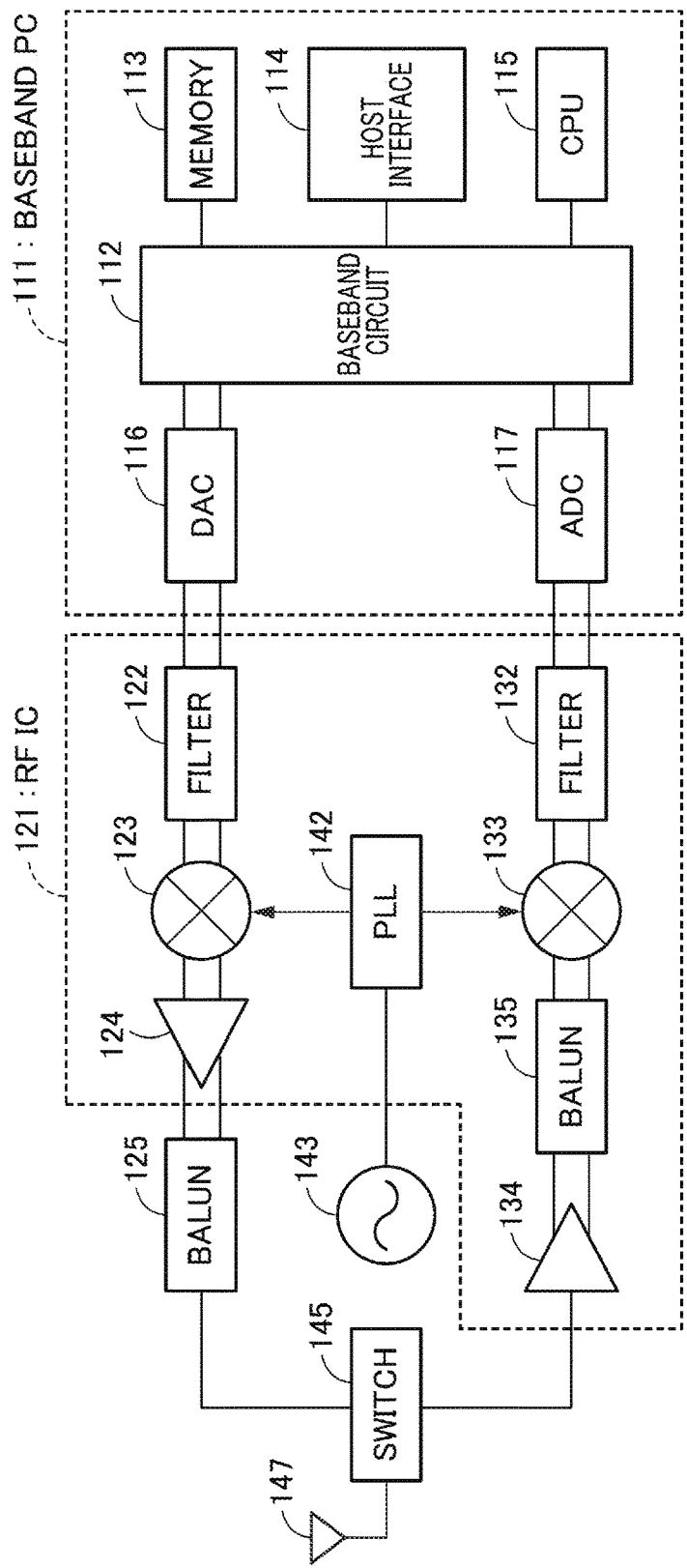
FIG. 21 is a diagram showing an overall configuration of the terminal or the access point.

FIG. 21 shows an example of hardware configuration of a WLAN module. The configuration shown in the figure may be applied for each case in where the wireless communication device is mounted in non-AP terminal or in an AP (Access Point) provided correspondingly to each function. That is, the configuration can be applied as specific examples of the wireless communication device as depicted in FIG. 3 or 4. In the configuration shown in figure, at least one antenna is included although a plurality of antennas are included. In this case, a plurality of sets of a transmission system (116 and 122 to 125), a reception system (117, 132 to 135), a PLL 142, a crystal oscillator (reference signal source) 143, and a switch 145 may be arranged according to the antennas, and each set may be connected to a control circuit 112. One or both of the PLL 142 and the crystal oscillator 143 correspond to an oscillator according to the present embodiment. The wireless LAN module (wireless communication device) includes a baseband IC (Integrated Circuit) 111, an RF (Radio Frequency) IC 121, a balun 125, the switch 145, and the antenna 147.

The baseband IC 111 includes the baseband circuit (control circuit) 112, a memory 113, a host interface 114, a CPU 115, a DAC (Digital to Analog Converter) 116, and an ADC (Analog to Digital Converter) 117.

The baseband IC 111 and the RF IC 121 may be formed on the same substrate. The baseband IC 111 and the RF IC 121 may be formed by one chip. Both or one of the DAC 116 and the ADC 117 may be arranged on the RF IC 121 or may be arranged on another IC. Both or one of the memory 113 and the CPU 115 may be arranged on an IC other than the baseband IC.

The memory 113 stores data to be transferred to and from the host system. The memory 113 also stores one or both of information to be transmitted to the terminal or the base station and information transmitted from the terminal or the base station. The memory 113 may also store a program necessary for the execution of the CPU 115 and may be used as a work area for the CPU 115 to execute the program. The memory 113 may be a volatile memory, such as an SRAM or a DRAM, or may be a non-volatile memory, such as a NAND or an MRAM.

The host interface 114 is an interface for connection to the host system. The interface can be anything, such as UART, SPI, SDIO, USB, or PCI Express.

The CPU 115 is a processor that executes a program to control the baseband circuit 112. The baseband circuit 112 mainly executes a process of the MAC layer and a process of the physical layer. One or both of the baseband circuit 112 and the CPU 115 correspond to the communication control apparatus that controls communication, the controller that controls communication, or controlling circuitry that controls communication.

At least one of the baseband circuit 112 or the CPU 115 may include a clock generator that generates a clock and may manage internal time by the clock generated by the clock generator.

For the process of the physical layer, the baseband circuit 112 performs addition of the physical header, coding, encryption, modulation process (which may include MIMO modulation), and the like of the frame to be transmitted and generates, for example, two types of digital baseband signals (hereinafter, "digital I signal" and "digital Q signal").

The DAC 116 performs DA conversion of signals input from the baseband circuit 112. More specifically, the DAC 116 converts the digital I signal to an analog I signal and converts the digital Q signal to an analog Q signal. Note that a single system signal may be transmitted without performing quadrature modulation. When a plurality of antennas are included, and single system or multi-system transmission signals equivalent to the number of antennas are to be distributed and transmitted, the number of provided DACs and the like may correspond to the number of antennas.

The RF IC 121 is, for example, one or both of an RF analog IC and a high frequency IC. The RF IC 121 includes a filter 122, a mixer 123, a preamplifier (PA) 124, the PLL (Phase Locked Loop) 142, a low noise amplifier (LNA) 134, a balun 135, a mixer 133, and a filter 132. Some of the elements may be arranged on the baseband IC 111 or another IC. The filters 122 and 132 may be bandpass filters or low pass filters.

The filter 122 extracts a signal of a desired band from each of the analog I signal and the analog Q signal input from the DAC 116. The PLL 142 uses an oscillation signal input from the crystal oscillator 143 and performs one or both of division and multiplication of the oscillation signal to thereby generate a signal at a certain frequency synchronized with the phase of the input signal. Note that the PLL 142 includes a VCO (Voltage Controlled Oscillator) and uses the VCO to perform feedback control based on the oscillation signal input from the crystal oscillator 143 to thereby obtain the signal at the certain frequency. The generated signal at the certain frequency is input to the mixer 123 and the mixer 133. The PLL 142 is equivalent to an example of an oscillator that generates a signal at a certain frequency.

The mixer 123 uses the signal at the certain frequency supplied from the PLL 142 to up-convert the analog I signal and the analog Q signal passed through the filter 122 into a radio frequency. The preamplifier (PA) amplifies the analog I signal and the analog Q signal at the radio frequency generated by the mixer 123, up to desired output power. The balun 125 is a converter for converting a balanced signal (differential signal) to an unbalanced signal (single-ended signal). Although the balanced signal is handled by the RF IC 121, the unbalanced signal is handled from the output of the RF IC 121 to the antenna 147. Therefore, the balun 125 performs the signal conversions.

The switch 145 is connected to the balun 125 on the transmission side during the transmission and is connected to the LNA 134 or the RF IC 121 on the reception side during the reception. The baseband IC 111 or the RF IC 121 may control the switch 145. There may be another circuit that controls the switch 145, and the circuit may control the switch 145.

The analog I signal and the analog Q signal at the radio frequency amplified by the preamplifier 124 are subjected to balanced-unbalanced conversion by the balun 125 and are then emitted as radio waves to the space from the antenna 147.

The antenna 147 may be a chip antenna, may be an antenna formed by wiring on a printed circuit board, or may be an antenna formed by using a linear conductive element.

The LNA 134 in the RF IC 121 amplifies a signal received from the antenna 147 through the switch 145 up to a level that allows demodulation, while maintaining the noise low. The balun 135 performs unbalanced-balanced conversion of the signal amplified by the low noise amplifier (LNA) 134. The mixer 133 uses the signal at the certain frequency input from the PLL 142 to down-convert, to a baseband, the reception signal converted to a balanced signal by the balun 135. More specifically, the mixer 133 includes a unit that generates carrier waves shifted by a phase of 90 degrees based on the signal at the certain frequency input from the PLL 142. The mixer 133 uses the carrier waves shifted by a phase of 90 degrees to perform quadrature demodulation of the reception signal converted by the balun 135 and generates an I (In-phase) signal with the same phase as the reception signal and a Q (Quad-phase) signal with the phase delayed by 90 degrees. The filter 132 extracts signals with desired frequency components from the I signal and the Q signal. Gains of the I signal and the Q signal extracted by the filter 132 are adjusted, and the I signal and the Q signal are output from the RF IC 121.

The ADC 117 in the baseband IC 111 performs AD conversion of the input signal from the RF IC 121. More specifically, the ADC 117 converts the I signal to a digital I signal and converts the Q signal to a digital Q signal. Note that a single system signal may be received without performing quadrature demodulation.

When a plurality of antennas are provided, the number of provided ADCs may correspond to the number of antennas. Based on the digital I signal and the digital Q signal, the baseband circuit 112 executes a process of the physical layer and the like, such as demodulation process, error correcting code process, and process of physical header, and obtains a frame. The baseband circuit 112 applies a process of the MAC layer to the frame. Note that the baseband circuit 112 may be configured to execute a process of TCP/IP when the TCP/IP is implemented.

(Eighth Embodiment)

Figure 22:
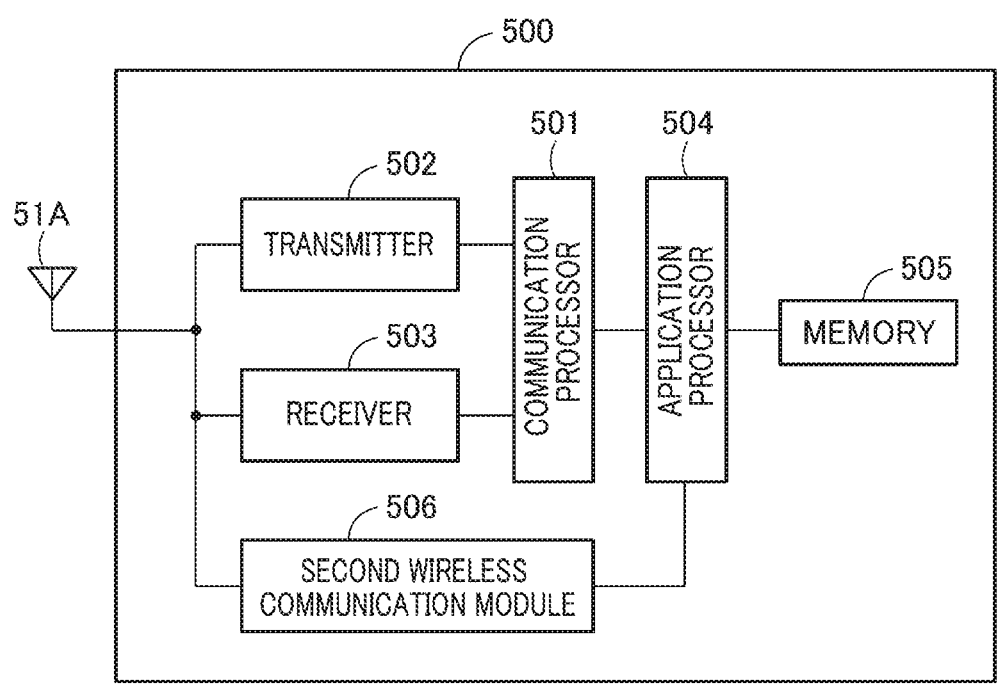
FIG. 22 is a diagram showing a hardware configuration example of the wireless communication device mounted on the terminal or the access point.

FIG. 22 is a functional block diagram of the terminal (STA) 500 according to an eighth embodiment. The STA 500 includes a communication processor 501, a transmitter 502, a receiver 503, an antenna 51A, an application processor 504 a memory 505, and a second wireless communication module 506. The base station (AP) may have the similar configuration.

The communication processor 501 has the functions similar to MAC/PHY manager as described in the first embodiment. The transmitter 502 and the receiver 503 have the functions similar to PHY processor and MAC processor as described in the first embodiment. The transmitter 502 and the receiver 503 may perform analog domain processing in PHY processor and the communication processor 501 may perform digital domain processing in MAC processor and digital domain processing in PHY processor. The communication processor 501 may internally possess a buffer for transferring data to and from the application processor 504. The buffer may be a volatile memory, such as an SRAM or a DRAM, or may be a non-volatile memory, such as a NAND or an MRAM.

The application processor 504 performs wireless communication through the communication processor 501, data writing or reading with the memory 505 and wireless communication through the second wireless communication module 506. The application processor 504 performs various processing such as Web browsing or multimedia processing of video or music or the like. The operation of application processor 504 may be carried out by software (program) processing by a processor such as CPU, by hardware, or both of them.

The memory 505 saves data received at the receiver 503 or the second wireless communication module 506, or data processed by the application processor 504. The memory 505 may be a volatile memory such as a DRAM or may be a non-volatile memory, such as a NAND or an MRAM. The memory 505 may be an SSD, an HDD, an SD card, or an eMMC or the like. The memory 505 may be arranged out of the access point 500. The second wireless communication module 506 has the similar configuration to the WLAN module as shown in FIG. 19 or FIG. 20 as one example. The second wireless communication module 506 performs wireless communication in a different manner than that realized by the communication processor 501, the transmitter 502 and the receiver 503. For example, in a case that the communication processor 501, the transmitter 502 and the receiver 503 perform wireless communication in compliance with IEEE802.11 standard, the second wireless communication module 506 may perform wireless communication in compliance with another wireless communication standard such as Bluetooth (trademark), LTE, Wireless HD or the like. The communication processor 501, the transmitter 502, the receiver 503 may perform wireless communication at 2.4 GHz/5 GHz and the second wireless communication module 506 may perform wireless communication at 60 GHz.

In the embodiment, one antenna is arranged and shared by the transmitter 502, the receiver 503 and the second wireless communication module 506. A switch controlling for connection destination of the antenna 51A may be arranged and thereby the antenna may be shared. A plurality of antennas may be arranged and may be employed by the transmitter 502, the receiver 503, and the second wireless communication module 506, respectively.

As one example, the communication processor 501 corresponds to an integrated circuit, and the transmitter 502 and the receiver 503 corresponds to an RF integrated circuit which transmits and receives frames. A set of the communication processor 501 and the application processor 504 is configured by one integrated circuit (1 chip). A part of the second wireless communication module 506 and the application processor 504 may be configured by one integrated circuit (1 chip).

The application processor performs control of wireless communication through the communication processor 501 and wireless communication through the second wireless communication module 506.

(Ninth Embodiment)

Figure 23A:
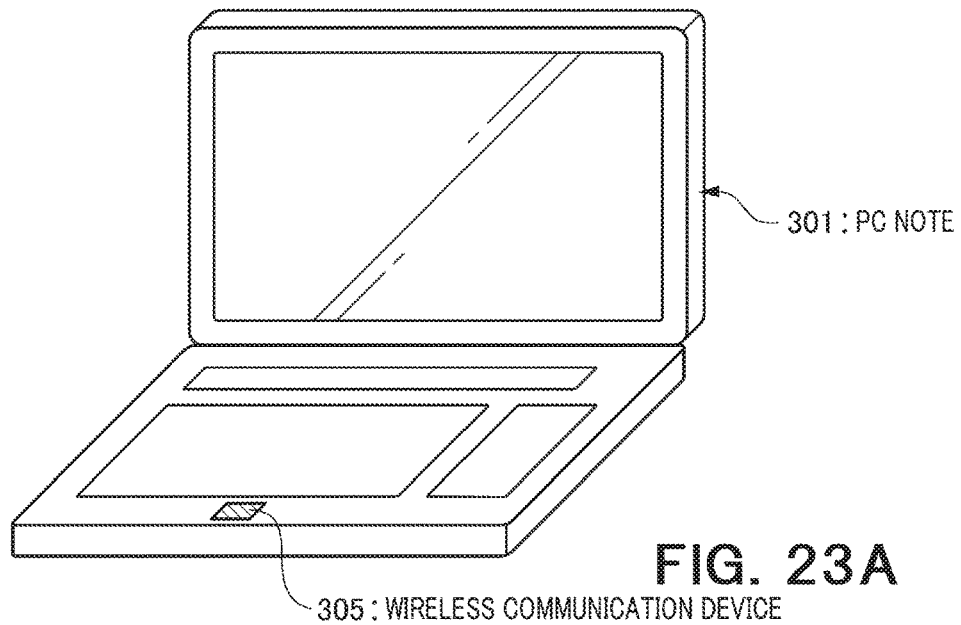
FIG. 23A and FIG. 23B each shows a perspective view of a terminal according to an embodiment of the present invention.
Figure 23B:
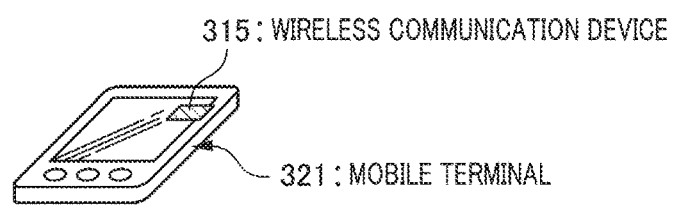

FIG. 23A and FIG. 23B are perspective views of wireless terminal according to the present embodiment. The wireless terminal in FIG. 23A is a notebook PC 301 and the wireless communication device (or a wireless device) in FIG. 23B is a mobile terminal 321. Each of them corresponds to one form of a terminal (which may indicate a base station). The notebook PC 301 and the mobile terminal 321 are equipped with wireless communication devices 305 and 315, respectively. The wireless communication device provided in a terminal (which may indicate a base station) which has been described above can be used as the wireless communication devices 305 and 315. A wireless terminal carrying a wireless communication device is not limited to notebook PCs and mobile terminals. For example, it can be installed in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device, a vehicle and so on.

Figure 24:
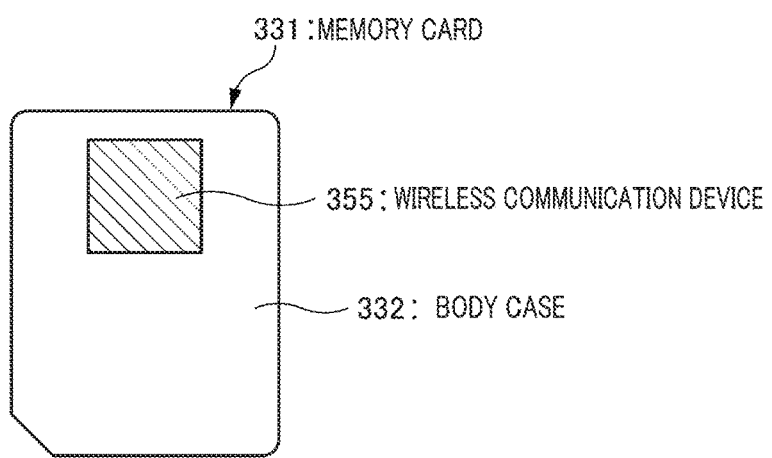
FIG. 24 is a diagram showing a memory card according to an embodiment of the present invention.

Moreover, a wireless communication device installed in a terminal (which may indicate a base station) can also be provided in a memory card. FIG. 24 illustrates an example of a wireless communication device mounted on a memory card. A memory card 331 contains a wireless communication device 355 and a body case 332. The memory card 331 uses the wireless communication device 355 for wireless communication with external devices. Here, in FIG. 24, the description of other installed elements (for example, a memory, and so on) in the memory card 331 is omitted.

(Tenth Embodiment)

In the present embodiment, a bus, a processor unit and an external interface unit are provided in addition to the configuration of the wireless communication device (the wireless communication device of the terminal (which may indicate the base station)) according to any of the above embodiments. The processor unit and the external interface unit are connected with an external memory (a buffer) through the bus. A firmware operates the processor unit. Thus, by adopting a configuration in which the firmware is included in the wireless communication device, the functions of the wireless communication device can be easily changed by rewriting the firmware. The processing unit in which the firmware operates may be a processor that performs the process of the communication controlling device or the control unit according to the present embodiment, or may be another processor that performs a process relating to extending or altering the functions of the process of the communication controlling device or the control unit. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

(Eleventh Embodiment)

In the present embodiment, a clock generating unit is provided in addition to the configuration of the wireless communication device (the wireless communication device of the terminal (which may indicate the base station)) according to any of the above embodiments. The clock generating unit generates a clock and outputs the clock from an output terminal to the exterior of the wireless communication device. Thus, by outputting to the exterior the clock generated inside the wireless communication device and operating the host by the clock output to the exterior, it is possible to operate the host and the wireless communication device in a synchronized manner.

(Twelfth Embodiment)

In the present embodiment, a power source unit, a power source controlling unit and a wireless power feeding unit are included in addition to the configuration of the wireless communication device (the wireless communication device of the terminal (which may indicate the base station)) according to any of the above embodiments. The power supply controlling unit is connected to the power source unit and to the wireless power feeding unit, and performs control to select a power source to be supplied to the wireless communication device. Thus, by adopting a configuration in which the power source is included in the wireless communication device, power consumption reduction operations that control the power source are possible.

(Thirteenth Embodiment)

In the present embodiment, a SIM card is added to the configuration of the wireless communication device according to any of the above embodiments. For example, the SIM card is connected with the controller, the transmitter, the receiver or plural of them in the wireless communication device. Thus, by adopting a configuration in which the SIM card is included in the wireless communication device, authentication processing can be easily performed.

(Fourteenth Embodiment)

In the eighth embodiment, a video image compressing/decompressing unit is added to the configuration of the wireless communication device according to any of the above embodiments. The video image compressing/decompressing unit is connected to the bus. Thus, by adopting a configuration in which the video image compressing/decompressing unit is included in the wireless communication device, transmitting a compressed video image and decompressing a received compressed video image can be easily done.

(Fifteenth Embodiment)

In the present embodiment, an LED unit is added to the configuration of the wireless communication device (the wireless communication device of the terminal (which may indicate the base station)) according to any of the above embodiments. For example, the LED unit is connected to the controller, the transmitter, the receiver or plural of them in the wireless communication device. Thus, by adopting a configuration in which the LED unit is included in the wireless communication device, notifying the operation state of the wireless communication device to the user can be easily done.

(Sixteenth Embodiment)

In the present embodiment, a vibrator unit is included in addition to the configuration of the wireless communication device wireless communication device (the wireless communication device of the terminal (which may indicate the base station)) according to any of the above embodiments. For example, the vibrator unit is connected to at least one of the controller, the transmitter, the receiver or plural of them in the wireless communication device. Thus, by adopting a configuration in which the vibrator unit is included in the wireless communication device, notifying the operation state of the wireless communication device to the user can be easily done.

(Seventeenth Embodiment)

In the present embodiment, the configuration of the wireless communication device includes a display in addition to the configuration of the wireless communication device (the wireless communication device of the terminal (which may indicate the base station)) according to any one of the above embodiments. The display may be connected to the controller, the transmitter, the receiver or plural of them in the wireless communication device via a bus (not shown). As seen from the above, the configuration including the display to display the operation state of the wireless communication device on the display allows the operation status of the wireless communication device to be easily notified to a user.

(Eighteenth Embodiment)

In the present embodiment, [1] the frame type in the wireless communication system, [2] a technique of disconnection between wireless communication devices, [3] an access scheme of a wireless LAN system and [4] a frame interval of a wireless LAN are described.

[1] Frame Type in Communication System

Generally, as mentioned above, frames treated on a wireless access protocol in a wireless communication system are roughly divided into three types of the data frame, the management frame and the control frame. These types are normally shown in a header part which is commonly provided to frames. As a display method of the frame type, three types may be distinguished in one field or may be distinguished by a combination of two fields. In IEEE 802.11 standard, identification of a frame type is made based on two fields of Type and Subtype in the Frame Control field in the header part of the MAC frame. The Type field is one for generally classifying frames into a data frame, a management frame, or a control frame and the Subtype field is one for identifying more detailed type in each of the classified frame types such as a beacon frame belonging to the management frame.

The management frame is a frame used to manage a physical communication link with a different wireless communication device. For example, there are a frame used to perform communication setting with the different wireless communication device or a frame to release communication link (that is, to disconnect the connection), and a frame related to the power save operation in the wireless communication device.

The data frame is a frame to transmit data generated in the wireless communication device to the different wireless communication device after a physical communication link with the different wireless communication device is established. The data is generated in a higher layer of the present embodiment and generated by, for example, a user's operation.

The control frame is a frame used to perform control at the time of transmission and reception (exchange) of the data frame with the different wireless communication device. A response frame transmitted for the acknowledgment in a case where the wireless communication device receives the data frame or the management frame, belongs to the control frame. The response frame is, for example, an ACK frame or a BlockACK frame. The RTS frame and the CTS frame are also the control frame.

These three types of frames are subjected to processing based on the necessity in the physical layer and then transmitted as physical packets via an antenna. In IEEE 802.11 standard (including the extended standard such as IEEE Std 802.11ac-2013), an association process is defined as one procedure for connection establishment. The association request frame and the association response frame which are used in the procedure are a management frame. Since the association request frame and the association response frame is the management frame transmitted in a unicast scheme, the frames causes the wireless communication terminal in the receiving side to transmit an ACK frame being a response frame. The ACK frame is a control frame as described in the above.

[2] Technique of Disconnection Between Wireless Communication Devices

For disconnection of the connection (release), there are an explicit technique and an implicit technique. As the explicit technique, a frame to disconnect any one of the connected wireless communication devices is transmitted. This frame corresponds to Deauthentication frame defined in IEEE 802.11 standard and is classified into the management frame. Normally, it is determined that the connection is disconnected at the timing of transmitting the frame to disconnect the connection in a wireless communication device on the side to transmit the frame and at the timing of receiving the frame to disconnect the connection in a wireless communication device on the side to receive the frame. Afterward, it returns to the initial state in a communication phase, for example, a state to search for a wireless communication device of the communicating partner. In a case that the wireless communication base station disconnects with a wireless communication terminal, for example, the base station deletes information on the wireless communication device from a connection management table if the base station holds the connection management table for managing wireless communication terminals which entries into the BSS of the base station-self. For example, in a case that the base station assigns an AID to each wireless communication terminal which entries into the BSS at the time when the base station permitted each wireless communication terminal to connect to the base station-self in the association process, the base station deletes the held information related to the AID of the wireless communication terminal disconnected with the base station and may release the AID to assign it to another wireless communication device which newly entries into the BSS.

On the other hand, as the implicit technique, it is determined that the connection state is disconnected in a case where frame transmission (transmission of a data frame and management frame or transmission of a response frame with respect to a frame transmitted by the subject device) is not detected from a wireless communication device of the connection partner which has established the connection for a certain period. Such a technique is provided because, in a state where it is determined that the connection is disconnected as mentioned above, a state is considered where the physical wireless link cannot be secured, for example, the communication distance to the wireless communication device of the connection destination is separated and the radio signals cannot be received or decoded. That is, it is because the reception of the frame to disconnect the connection cannot be expected.

As a specific example to determine the disconnection of connection in an implicit method, a timer is used. For example, at the time of transmitting a data frame that requests an acknowledgment response frame, a first timer (for example, a retransmission timer for a data frame) that limits the retransmission period of the frame is activated, and, if the acknowledgement response frame to the frame is not received until the expiration of the first timer (that is, until a desired retransmission period passes), retransmission is performed. When the acknowledgment response frame to the frame is received, the first timer is stopped.

On the other hand, when the acknowledgment response frame is not received and the first timer expires, for example, a management frame to confirm whether a wireless communication device of a connection partner is still present (in a communication range) (in other words, whether a wireless link is secured) is transmitted, and, at the same time, a second timer (for example, a retransmission timer for the management frame) to limit the retransmission period of the frame is activated. Similarly to the first timer, even in the second timer, retransmission is performed if an acknowledgment response frame to the frame is not received until the second timer expires, and it is determined that the connection is disconnected when the second timer expires.

Alternatively, a third timer is activated when a frame is received from a wireless communication device of the connection partner, the third timer is stopped every time the frame is newly received from the wireless communication device of the connection partner, and it is activated from the initial value again. When the third timer expires, similarly to the above, a management frame to confirm whether the wireless communication device of the connection party is still present (in a communication range) (in other words, whether a wireless link is secured) is transmitted, and, at the same time, a second timer (for example, a retransmission timer for the management frame) to limit the retransmission period of the frame is activated. Even in this case, retransmission is performed if an acknowledgment response frame to the frame is not received until the second timer expires, and it is determined that the connection is disconnected when the second timer expires. The latter management frame to confirm whether the wireless communication device of the connection partner is still present may differ from the management frame in the former case. Moreover, regarding the timer to limit the retransmission of the management frame in the latter case, although the same one as that in the former case is used as the second timer, a different timer may be used.

[3] Access Scheme of Wireless LAN System

For example, there is a wireless LAN system with an assumption of communication or competition with a plurality of wireless communication devices. CSMA/CA is set as the basis of an access scheme in IEEE802.11 (including an extension standard or the like) wireless LAN. In a scheme in which transmission by a certain wireless communication device is grasped and transmission is performed after a fixed time from the transmission end, simultaneous transmission is performed in the plurality of wireless communication devices that grasp the transmission by the wireless communication device, and, as a result, radio signals collide and frame transmission fails. By grasping the transmission by the certain wireless communication device and waiting for a random time from the transmission end, transmission by the plurality of wireless communication devices that grasp the transmission by the wireless communication device stochastically disperses. Therefore, if the number of wireless communication devices in which the earliest time in a random time is subtracted is one, frame transmission by the wireless communication device succeeds and it is possible to prevent frame collision. Since the acquisition of the transmission right based on the random value becomes impartial between the plurality of wireless communication devices, it can say that a scheme adopting Collision Avoidance is a suitable scheme to share a radio medium between the plurality of wireless communication devices.

[4] Frame Interval of Wireless LAN

The frame interval of IEEE802.11 wireless LAN is described. There are several types of frame intervals used in IEEE802.11 wireless LAN, such as distributed coordination function interframe space (DIFS), arbitration interframe space (AIFS), point coordination function interframe space (PIFS), short interframe space (SIFS), extended interframe space (EIFS) and reduced interframe space (RIFS).

The definition of the frame interval is defined as a continuous period that should confirm and open the carrier sensing idle before transmission in IEEE802.11 wireless LAN, and a strict period from a previous frame is not discussed. Therefore, the definition is followed in the explanation of IEEE802.11 wireless LAN system. In IEEE802.11 wireless LAN, a waiting time at the time of random access based on CSMA/CA is assumed to be the sum of a fixed time and a random time, and it can say that such a definition is made to clarify the fixed time.

DIFS and AIFS are frame intervals used when trying the frame exchange start in a contention period that competes with other wireless communication devices on the basis of CSMA/CA. DIFS is used in a case where priority according to the traffic type is not distinguished, AIFS is used in a case where priority by traffic identifier (TID) is provided.

Since operation is similar between DIFS and AIFS, an explanation below will mainly use AIFS. In IEEE802.11 wireless LAN, access control including the start of frame exchange in the MAC layer is performed. In addition, in a case where QoS (Quality of Service) is supported when data is transferred from a higher layer, the traffic type is notified together with the data, and the data is classified for the priority at the time of access on the basis of the traffic type. The class at the time of this access is referred to as "access category (AC)". Therefore, the value of AIFS is provided every access category.

PIFS denotes a frame interval to enable access which is more preferential than other competing wireless communication devices, and the period is shorter than the values of DIFS and AIFS. SIFS denotes a frame interval which can be used in a case where frame exchange continues in a burst manner at the time of transmission of a control frame of a response system or after the access right is acquired once. EIFS denotes a frame interval caused when frame reception fails (when the received frame is determined to be error).

RIFS denotes a frame interval which can be used in a case where a plurality of frames are consecutively transmitted to the same wireless communication device in a burst manner after the access right is acquired once, and a response frame from a wireless communication device of the transmission partner is not requested while RIFS is used.

Figure 25:
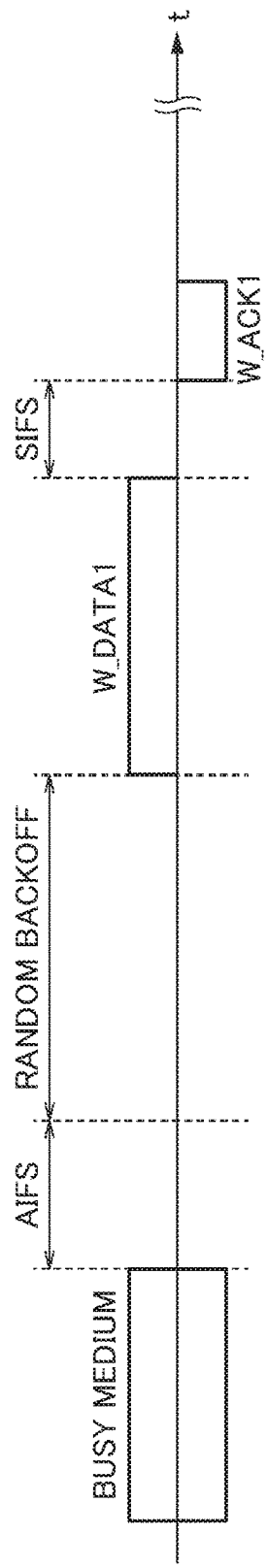
FIG. 25 is a diagram showing an example of frame exchange in a contention duration.

Here, FIG. 25 illustrates one example of frame exchange in a competitive period based on the random access in IEEE802.11 wireless LAN.

When a transmission request of a data frame (W_DATA1) is generated in a certain wireless communication device, a case is assumed where it is recognized that a medium is busy (busy medium) as a result of carrier sensing. In this case, AIFS of a fixed time is set from the time point at which the carrier sensing becomes idle, and, when a random time (random backoff) is set afterward, data frame W_DATA1 is transmitted to the communicating partner.

The random time is acquired by multiplying a slot time by a pseudorandom integer led from uniform distribution between contention windows (CW) given by integers from 0. Here, what multiplies CW by the slot time is referred to as "CW time width". The initial value of CW is given by CWmin, and the value of CW is increased up to CWmax every retransmission. Similarly to AIFS, both CWmin and CWmax have values every access category. In a wireless communication device of transmission destination of W_DATA1, when reception of the data frame succeeds, a response frame (W_ACK1) is transmitted after SIFS from the reception end time point. If it is within a transmission burst time limit when W_ACK1 is received, the wireless communication device that transmits W_DATA1 can transmit the next frame (for example, W_DATA2) after SIFS.

Although AIFS, DIFS, PIFS and EIFS are functions between SIFS and the slot-time, SIFS and the slot time are defined every physical layer. Moreover, although parameters whose values being set according to each access category, such as AIFS, CWmin and CWmax, can be set independently by a communication group (which is a basic service set (BSS) in IEEE802.11 wireless LAN), the default values are defined.

For example, in the definition of 802.11ac, with an assumption that SIFS is 16 µS and the slot time is 9 µs, and thereby PIFS is 25 µs, DIFS is 34 µs, the default value of the frame interval of an access category of BACKGROUND (AC_BK) in AIFS is 79 µs, the default value of the frame interval of BEST EFFORT (AC_BE) is 43 µs, the default value of the frame interval between VIDEO(AC_VI) and VOICE(AC_VO) is 34 µs, and the default values of CWmin and CWmax are 31 and 1023 in AC_BK and AC_BE, 15 and 31 in AC_VI and 7 and 15 in AC_VO. Here, EIFS denotes the sum of SIFS, DIFS, and the time length of a response frame transmitted at the lowest mandatory physical rate. In the wireless communication device which can effectively takes EIFS, it may estimate an occupation time length of a PHY packet conveying a response frame directed to a PHY packet due to which the EIFS is caused and calculates a sum of SIFS, DIFS and the estimated time to take the EIFS.

Note that the frames described in the embodiments may indicate not only things called frames in, for example, IEEE 802.11 standard, but also things called packets, such as Null Data Packets.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor. The circuitry" may refer one or more electric circuits disposed on a single chip, or may refer one or more electric circuits disposed on a plurality of chips or a plurality of devices in a dispersed manner.

In the specification, the expression "at least one of a, b or c" is an expression to encompass not only "a", "b", "c", "a and b", "a and c", "b and c", "a, b and c" or any combination thereof but also a combination of at least a plurality of same elements such as "a and a", "a, b and b" or "a, a, b, b, c and c". Also, the expression is an expression to allow a set including an element other than "a", "b" and "c" such as "a, b, c, and d".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. A wireless communication apparatus, comprising:
    wireless communication circuitry configured to transmit a transmission signal and receive a reception signal for communication; and
    controlling circuitry configured to communicate with a first wireless communication apparatus through the wireless communication circuitry to determine an identification of the first wireless communication apparatus, and,
    wherein the wireless communication circuitry is configured to transmit a control signal including the identification for activation to restart communication with the first wireless communication apparatus after the controlling circuitry fails to detect the first wireless communication apparatus wherein the control signal has a modulation scheme and a packet format that are different from a modulation scheme and a packet format of the transmission signal or the reception signal for communication.

2. The wireless communication apparatus according to claim 1, wherein the wireless communication circuitry is configured to repetitively transmit the control signal during a predetermined period.

3. The wireless communication apparatus according to claim 2,
    wherein upon receipt of a predetermined signal from the first wireless communication apparatus in the predetermined period, the wireless communication circuitry is configured to stop transmitting the control signal.

4. The wireless communication apparatus according to claim 1, wherein the control signal contains information that designates to activate the first wireless communication apparatus as one of a base station or a terminal that is a non-base station.

5. The wireless communication apparatus according to claim 1, wherein the first wireless communication apparatus is a base station.

6. The wireless communication apparatus according to claim 1, further comprising at least one antenna.

7. A wireless communication apparatus, comprising:
    wireless communication circuitry configured to transmit a transmission signal and receive a reception signal for communication;
    a receiver configured to receive a control signal for activation; and
    controlling circuitry configured to control the wireless communication circuitry,
    wherein the controlling circuitry is configured to communicate with another wireless communication apparatus to determine an identification of the wireless communication apparatus,
    wherein the controlling circuitry is configured to set the wireless communication circuitry to a sleep state after the controlling circuitry detects null reception from the other wireless communication apparatus for a predetermined period, and wherein the controlling circuitry is configured to cancel the sleep state of the wireless communication circuitry after the controlling circuitry detects that the receiver receives the control signal including the identification wherein the control signal has a modulation scheme and a packet format that are different from a modulation scheme and a packet format of the transmission signal or the reception signal for communication.

8. The wireless communication apparatus according to claim 7, wherein the controlling circuitry is configured to set the receiver to the sleep state when the wireless communication circuitry is not in the sleep state, and configured to cancel the sleep state of the receiver when the controlling circuitry sets the wireless communication circuitry to the sleep state.

9. The wireless communication apparatus according to claim 7, wherein the control signal contains instruction information designating that the wireless communication apparatus is activated as one of a base station or a terminal that is a non-base station, and the controlling circuitry is configured to activate the wireless communication circuitry according to the instruction information.

10. The wireless communication apparatus according to claim 7, wherein the wireless communication apparatus is a base station.

11. The wireless communication apparatus according to claim 7, further comprising at least one antenna.

12. A wireless communication method at least partially performed by wireless communication circuitry of a wireless communication apparatus, the method comprising: transmitting a transmission signal and receiving a reception signal for communication communicating with a first wireless communication apparatus through the wireless communication circuitry to determine an identification of the first wireless communication apparatus; and transmitting a control signal including the identification for activation of the first wireless communication apparatus to restart communication with the first wireless communication apparatus through the wireless communication circuitry after the wireless communication circuitry fails to detect the first wireless communication apparatus wherein the control signal has a modulation scheme and a packet format that are different from a modulation scheme and a packet format of the transmission signal or the reception signal for communication.

13. The wireless communication method according to claim 12, comprising:

transmitting repetitively the control signal during a predetermined period.

14. The wireless communication method according to claim 13, comprising:

stopping transmitting the control signal upon receipt of a predetermined signal from the first wireless communication apparatus in the predetermined period.

15. The wireless communication method according to claim 12, wherein the control signal contains information that designates to activate the first wireless communication apparatus as one of a base station or a terminal that is a non-base station.

16. The wireless communication method according to claim 12, wherein the first wireless communication apparatus is a base station.

17. The wireless communication method according to claim 12, wherein the transmitting of the control signal is carried out via at least one antenna.

* * * * *